(12) United States Patent
Oddo

(10) Patent No.: US 8,069,076 B2
(45) Date of Patent: Nov. 29, 2011

(54) GENERATING AUDIENCE ANALYTICS

(75) Inventor: Anthony Scott Oddo, Boston, MA (US)

(73) Assignee: Cox Communications, Inc., Atlanta, GA (US)

( * ) Notice: Subject to any disclaimer, the term of this patent is extended or adjusted under 35 U.S.C. 154(b) by 1250 days.

(21) Appl. No.: 10/551,102

(22) PCT Filed: Mar. 24, 2004

(86) PCT No.: PCT/US2004/008924
§ 371 (c)(1),
(2), (4) Date: Aug. 14, 2006

(87) PCT Pub. No.: WO2004/088457
PCT Pub. Date: Oct. 14, 2004

(65) Prior Publication Data
US 2007/0011039 A1   Jan. 11, 2007

Related U.S. Application Data

(60) Provisional application No. 60/457,223, filed on Mar. 25, 2003.

(51) Int. Cl.
*G06Q 10/00* (2006.01)
(52) U.S. Cl. .................................. 705/7.29; 705/7.31
(58) Field of Classification Search ................ 705/7.29, 705/7.31
See application file for complete search history.

(56) References Cited

U.S. PATENT DOCUMENTS

| | | | |
|---|---|---|---|
| 5,223,924 | A | 6/1993 | Strubbe |
| 5,347,632 | A | 9/1994 | Filepp et al. |
| 5,572,643 | A | 11/1996 | Judson |

(Continued)

FOREIGN PATENT DOCUMENTS

EP   04 75 8240   3/2006

(Continued)

OTHER PUBLICATIONS

Harvey, Bill. Better Television Audience Measurement through the research integration of set-top box data.*

(Continued)

*Primary Examiner* — Johnna Loftis
(74) *Attorney, Agent, or Firm* — Merchant & Gould

(57) ABSTRACT

The present invention is directed to generating audience analytics that includes providing a database containing a plurality of user input pattern profiles representing the group of users of terminal device, in which each user of the group is associated with one of the plurality of user input pattern profiles. A clickstream algorithm, tracking algorithm, neural network, Bayes classifier algorithm, or affinity-day part algorithm can be used to generate the user input pattern profiles. A user input pattern is detected based upon use of the terminal device by the current user and the user input pattern of the current user is dynamically matched with one of the user input pattern profiles contained in the database. The current user is identified based upon dynamic matching of the user input pattern generated by the current user with one of the user input pattern profiles. The present invention processes each user input pattern profile to identify a demographic type. A plurality of biometric behavior models are employed to identify a unique demographic type. Each user input pattern profile is compared against the plurality of biometric behavior models to match each user input pattern profile with one of the biometric behavior models such that each user input pattern profile is correlated with one demographic type. Audience analytics are then based upon the identified demographic types.

17 Claims, 9 Drawing Sheets

U.S. PATENT DOCUMENTS

| | | | |
|---|---|---|---|
| 5,592,551 A | 1/1997 | Lett et al. | |
| 5,659,350 A | 8/1997 | Hendricks et al. | |
| 5,710,884 A | 1/1998 | Dedrick | |
| 5,740,252 A | 4/1998 | Minor et al. | |
| 5,740,549 A | 4/1998 | Reilly et al. | |
| 5,754,774 A | 5/1998 | Bittinger et al. | |
| 5,761,662 A | 6/1998 | Dasan | |
| 5,794,210 A | 8/1998 | Goldhaber et al. | |
| 5,798,785 A | 8/1998 | Hendricks et al. | |
| 5,801,747 A | 9/1998 | Bedard | |
| 5,812,784 A | 9/1998 | Watson et al. | |
| 5,848,396 A | 12/1998 | Gerace | |
| 5,848,397 A | 12/1998 | Marsh et al. | |
| 5,913,040 A | 6/1999 | Rakavy et al. | |
| 5,945,988 A | 8/1999 | Williams et al. | |
| 5,946,646 A | 8/1999 | Schena et al. | |
| 5,948,061 A | 9/1999 | Merriman et al. | |
| 5,959,623 A | 9/1999 | Van Hoff et al. | |
| 5,966,695 A | 10/1999 | Melchione et al. | |
| 5,974,398 A | 10/1999 | Hanson et al. | |
| 6,005,597 A | 12/1999 | Barrett et al. | |
| 6,012,051 A | 1/2000 | Sammon, Jr. et al. | |
| 6,014,638 A | 1/2000 | Burge et al. | |
| 6,014,654 A | 1/2000 | Ariyoshi | |
| 6,018,372 A | 1/2000 | Etheredge | |
| 6,026,368 A | 2/2000 | Brown et al. | |
| 6,041,311 A | 3/2000 | Chislenko et al. | |
| 6,049,777 A | 4/2000 | Sheena et al. | |
| 6,064,980 A | 5/2000 | Jacobi et al. | |
| 6,078,866 A | 6/2000 | Buck et al. | |
| 6,088,722 A * | 7/2000 | Herz et al. | 709/217 |
| 6,092,049 A | 7/2000 | Chislenko et al. | |
| 6,112,192 A * | 8/2000 | Capek | 705/59 |
| 6,119,101 A | 9/2000 | Peckover | |
| 6,134,532 A | 10/2000 | Lazarus et al. | |
| 6,144,944 A | 11/2000 | Kurtzman, II et al. | |
| 6,157,946 A | 12/2000 | Itakura et al. | |
| 6,163,316 A | 12/2000 | Killian | |
| 6,177,931 B1 | 1/2001 | Alexander et al. | |
| 6,208,975 B1 * | 3/2001 | Bull et al. | 705/10 |
| 6,236,975 B1 | 5/2001 | Boe et al. | |
| 6,236,978 B1 | 5/2001 | Tuzhilin | |
| 6,243,760 B1 | 6/2001 | Armbruster et al. | |
| 6,285,983 B1 | 9/2001 | Jenkins | |
| 6,285,987 B1 * | 9/2001 | Roth et al. | 705/27 |
| 6,295,061 B1 | 9/2001 | Park et al. | |
| 6,298,348 B1 | 10/2001 | Eldering | |
| 6,305,017 B1 | 10/2001 | Satterfield | |
| 6,311,211 B1 | 10/2001 | Shaw et al. | |
| 6,327,574 B1 | 12/2001 | Kramer et al. | |
| 6,334,110 B1 | 12/2001 | Walter et al. | |
| 6,366,298 B1 | 4/2002 | Haitsuka et al. | |
| 6,385,590 B1 * | 5/2002 | Levine | 705/10 |
| 6,427,063 B1 | 7/2002 | Cook et al. | |
| 6,449,632 B1 | 9/2002 | David et al. | |
| 6,708,335 B1 | 3/2004 | Ozer et al. | |
| 6,757,691 B1 * | 6/2004 | Welsh et al. | 1/1 |
| 6,769,009 B1 | 7/2004 | Reisman | |
| 6,845,102 B1 | 1/2005 | Bendelac et al. | |
| 6,882,977 B1 | 4/2005 | Miller | |
| 6,882,990 B1 | 4/2005 | Barnhill et al. | |
| 6,889,218 B1 | 5/2005 | Nassehi | |
| 7,003,792 B1 | 2/2006 | Yuen | |
| 7,020,643 B2 | 3/2006 | Mah et al. | |
| 7,092,926 B2 * | 8/2006 | Cerrato | 706/48 |
| 7,328,216 B2 * | 2/2008 | Hofmann et al. | 1/1 |
| 7,496,553 B2 | 2/2009 | Cerrato | |
| 2001/0011264 A1 | 8/2001 | Kawasaki | |
| 2001/0049620 A1 | 12/2001 | Blasko | |
| 2001/0056370 A1 | 12/2001 | Tafla | |
| 2002/0004744 A1 | 1/2002 | Muyres et al. | |
| 2002/0013729 A1 | 1/2002 | Kida | |
| 2002/0059094 A1 | 5/2002 | Hosea et al. | |
| 2002/0129368 A1 | 9/2002 | Schlack et al. | |
| 2005/0028208 A1 | 2/2005 | Ellis et al. | |

FOREIGN PATENT DOCUMENTS

| | | |
|---|---|---|
| WO | WO 00/33233 A | 6/2000 |
| WO | WO 00/49801 | 8/2000 |
| WO | WO 01/20481 A | 3/2001 |
| WO | WO 02/082214 A | 10/2002 |
| WO | WO 02/102030 A | 12/2002 |

OTHER PUBLICATIONS

Bloedorn, Eric; Mani, Inderjeet. Using NLP for Machine Learning of User Profiles. Artificial Intelligence Technical Center, The MITRE Corporation 1998.*

Good, Nathaniel; Schafer, J. Ben; Konstan, Joseph A.; Borchers, Al; Sarwar, Badrul; Herlocker, Jon; and Riedl, John. Combining Collaborative Filtering with Personal Agents for Better Recommendations. GroupLens Research Project. Dept. of Computer Science and Engineering, University of Minnesota. 1999.*

Balabanovic, Marko. An Adaptive Web Page Recommendation Service. Department of Computer Science, Stanford University. 1997.*

Pazzani, Michael J. Framework for Collaborative, Content0Based and Demographic Filtering. Department of Informaiton and Computer Science University of California, Irvine. 1999.*

International Search Report in corresponding PCT/US04/08924, Dec. 28, 2004, Sedna Patent Services, LLC.

Frook, John Evan. Web Add-On Helps Identify Site Visitors. CommunicationsWeek. Manhasset: Oct. 30, 1995. p. 27 from proquest.

CacheFlow Delivers cIQ Content-Smart Delivery Architecture. Business Wire. New York: Feb. 12, 2001. from Proquest. p. 2.

"AdForce and Activate Deliver Next Generation Web Advertising," *Business Wire* (Nov. 8, 2000).

Kannan, P. et al., "Marketing Information on the I-Way," *Communications of the ACM*, vol. 41, No. 3, pp. 35-43 (Mar. 1998).

U.S. Appl. No. 09/558,755, filed Apr. 21, 2000 entitled "Method and System for Web User Profiling and Selective Content Delivery".

U.S Official Action mailed Sep. 11, 2002, in U.S. Appl. No. 09/558,755.

U.S Official Action mailed Apr. 3, 2003, in U.S. Appl. No. 09/558,755.

U.S Official Action mailed Nov. 12, 2003, in U.S. Appl. No. 09/558,755.

U.S Official Action mailed Jan. 4, 2007, in U.S. Appl. No. 09/558,755.

U.S Official Action mailed Jul. 9, 2007, in U.S. Appl. No. 09/558,755.

U.S Official Action mailed Sep. 30, 2009, in U.S. Appl. No. 09/558,755.

U.S Official Action mailed Apr. 14, 2010, in U.S. Appl. No. 09/558,755.

U.S Official Action mailed Sep. 29, 2010, in U.S. Appl. No. 09/558,755.

U.S Official Action mailed Dec. 16, 2004, in U.S. Appl. No. 09/877,974.

U.S Official Action mailed Aug. 11, 2005, in U.S. Appl. No. 09/877,974.

U.S Official Action mailed Jan. 24, 2006, in U.S. Appl. No. 09/877,974.

U.S Official Action mailed Dec. 1, 2006, in U.S. Appl. No. 09/877,974.

U.S Official Action mailed May 17, 2007, in U.S. Appl. No. 09/877,974.

U.S Official Action mailed Oct. 31, 2007, in U.S. Appl. No. 09/877,974.

U.S Official Action mailed Apr. 3, 2008, in U.S. Appl. No. 09/877,974.

U.S Official Action mailed Oct. 22, 2008, in U.S. Appl. No. 09/877,974.

U.S Official Action mailed May 15, 2009, in U.S. Appl. No. 09/877,974.

U.S Official Action mailed Jan. 13, 2010, in U.S. Appl. No. 09/877,974.

U.S Official Action mailed Sep. 14, 2010, in U.S. Appl. No. 09/877,974.

Advisory Action mailed Feb. 3, 2004, in co-pending U.S. Appl. No. 09/558,755, 3pp.
Examiner's Answer to Appeal Brief mailed Nov. 3, 2005, in co-pending U.S. Appl. No. 09/558,755, 19 pp.
BPAI Decision mailed Aug. 29, 2006, in co-pending U.S. Appl. No. 09/558,755, 10 pp.
Advisory Action mailed Oct. 1, 2007, in co-pending U.S. Appl. No. 09/558,755, 4 pp.
Examiner's Answer to Appeal Brief mailed May 29, 2008, in co-pending U.S. Appl. No. 09/558,755, 32 pp.
BPAI Decision mailed May 28, 2009, in co-pending U.S. Appl. No. 09/558,755, 8 pp.
Advisory Action mailed Jun. 30, 2010, in co-pending U.S. Appl. No. 09/558,755, 4 pp.
Miscellaneous Action mailed Aug. 10, 2006, co-pending U.S. Appl. No. 09/877,974, 5 pp.
Advisory Action mailed Feb. 26, 2007, in co-pending U.S. Appl. No. 09/877,974, 5 pp.
Advisory Action mailed Jan. 14, 2008, in co-pending U.S. Appl. No. 09/877,974, 4 pp.
Advisory Action mailed Feb. 4, 2009, in co-pending U.S. Appl. No. 09/877,974, 3 pp.
Advisory Action mailed Jul. 14, 2010, in co-pending U.S. Appl. No. 09/877,974, 3 pp.
Notice of Allowance mailed Feb. 22, 2011, in pending U.S. Appl. No. 09/877,974, 11 pp.
Office Action mailed Mar. 16, 2011, in pending U.S. Appl. No. 09/558,755, 8 pp.
Notice of Allowance mailed Sep. 29, 2011 in U.S. Appl. No. 09/558,755, 16 pages.

* cited by examiner

GENERATING AUDIENCE ANALYTICS

CROSS REFERENCE TO RELATED APPLICATIONS

The present application is related to and claims priority from commonly owned U.S. Provisional Application Ser. No. 60/457,223 filed on Mar. 25, 2003 entitled "Generating Audience Analytics". The present invention claims priority from commonly owned U.S. patent application Ser. No. 09/558,755 filed on Apr. 21, 2000 entitled "Method and System for iTV User Profiling, Content Recommendations, and Selective Content Delivery", which in turn claims priority from U.S. Provisional Patent Application Ser. No. 60/154,640 filed on Sep. 17, 1999 and entitled "Method and Apparatus for Predictive Marketing."

INCORPORATION BY REFERENCE

U.S. patent application Ser. No. 09/558,755 filed on Apr. 21, 2000 entitled "Method and System for iTV User Profiling, Content Recommendations, and Selective Content Delivery" incorporated herein by reference as if set forth in its entirety.

U.S. patent application Ser. No. 09/766,377 filed on Jan. 19, 2001 entitled "Method and Apparatus for Data Clustering" incorporated herein by reference as if set forth in its entirety.

U.S. Provisional Patent Application Ser. No. 60/360,068 filed Feb. 25, 2002 entitled "Privacy-Maintaining Methods and Systems for Collecting Information" incorporated herein by reference as if set forth in its entirety.

U.S. patent application Ser. No. 10/117,654 filed on Apr. 5, 2002 entitled "Method and Apparatus for Identifying Unique Client Users from User Behavior Data" incorporated herein by reference as if set forth in its entirety.

FIELD OF THE INVENTION

The present invention relates generally to interactive television (iTV), the Internet, and other content delivery systems and, more particularly, to a method and system for analyzing user input and clickstream data to generate audience analytics.

BACKGROUND OF THE INVENTION

Currently, audience analytics are carried out by a few large companies across several different media, most notably television (TV) audience measurement carried out by Nielsen Media Research. The data is collected in several different ways, including electronic devices attached to televisions (people meters) that require each member of the household (and visitors) to enter in codes corresponding to themselves, at each instance when a particular viewer watches a program. Additionally, this conventional method can require paper diaries that viewers keep listing all of the programs viewed. In all cases, the people participating are selected in a controlled manner that attempts, by sampling methods, to be representative of the TV viewing public as a whole.

The main drawback to this approach is the expense associated with selecting and maintaining a sample size large enough to yield statistically significant results. For example, as cable and satellite options have expanded the number of available choices for the viewer, the audience for each station has become further fragmented to the point where the existing sample sizes used in audience analytics become too small to produce statistically significant results for these stations. The decreasing audience sample sizes also make it difficult for advertisers to clearly determine what kind of audience certain stations possess. Likewise, cable operators, satellite system providers, and multiple system operators (MSOs) have no precise way of knowing which stations to add or drop from their lineup or how best to package stations into service tiers.

The limitations of sample size can be overcome by choosing a much larger sample. However, to avoid the cost of creating a very large representative sample, a sampling service must select people at random in a cost effective manner, requiring an inexpensive data collection mechanism that includes low-cost incentives for people to join a sampling panel. One company, ComScore, has attempted this on the Internet by constructing a large panel of over a million users. ComScore generates panels by giving people incentives to download the tracking software ComScore uses to monitor their Internet Web surfing activities. However, critics point out that panels constructed employing methods such as ComScore's are statistically un-useful because only certain types of people would give up their privacy in exchange for money or free software. Also, the reliability of data provided by services such as ComScore is suspect, since they must rely on users to provide accurate information when joining. For example, each new user provides demographic information by completing a survey, but there is no accurate method of verifying that users told the truth.

To date, legal and technical issues have impeded accurate measurement of television audience demographic information. For example, regulations set strict limits on how a MSO can utilize personally identifiable information, thereby preventing a MSO to easily or cost-effectively obtain the required consent from the millions of people needed to create a useful sample group. It would be desirable to create passive methods and systems for generating audience analytics by analyzing user identifiable information. It would also be desirable to provide a system that creates analytics anonymously, whereby the analytics can be sold to others, used to deliver targeted content or advertising, or used for other additional purposes.

SUMMARY OF THE INVENTION

The present invention provides passive methods and systems to generate audience analytics. In one embodiment, a clickstream algorithm, a neural network, tracking algorithm, Bayes classifier algorithm, or affinity-day part algorithm creates and updates user input pattern profiles based on a household's content user input data such as viewing events or Web site usage. In another practice, the clickstream algorithm, the neural network, tracking algorithm, Bayes classifier algorithm, or affinity-day part algorithm processes user events to determine the overall make-up of a given household. In a further aspect, the present invention combines the household clickstream with demographics to determine the overall makeup of the household. In another embodiment, the present invention compares the content viewing clickstream to user profile data and known biometric behavior models to determine which user profile is active. All of these viewing determinations can be used to generate audience analytics. In a further practice, the audience analytics can form the basis for providing a user targeted content delivery or advertising.

These and other features and advantages of the present invention will become readily apparent from the following detailed description wherein embodiments of the invention are shown and described. As will be realized, the invention is capable of other and different embodiments and its several details may be capable of modifications in various respects, all without departing from the invention. Accordingly, the drawings and description are to be regarded as illustrative in nature and not in a restrictive or limiting sense.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION

Overview:

The present invention is directed to methods and systems for generating audience analytics. The invention comprises a multi-tiered system that employs statistical inferences, a clickstream algorithm, a tracking algorithm, a neural network, a Bayes classifier algorithm, an affinity-day part algorithm and biometrics to a household's content delivery and clickstream to determine an overall makeup of the household, determine which household member is watching at any time, and generate audience analytics. To generate audience analytics, the present invention profiles users and households based on, for example, user viewing habits, TV interactions, Web site usage, and TV or Web surfing habits.

In addition to generating audience analytics, the ability to distinguish which users are watching a given television program can be used to target content delivery, provide advertising, or create program viewing recommendations for the user. Exemplary methods of identifying a current user can be found in commonly-owned U.S. patent application Publication No. 2002/0178257 published Nov. 28, 2002, entitled "Method and Apparatus For Identifying Unique Client Users From User Behavioral Data," which is expressly incorporated by reference herein. Methods of identifying a current user and delivering targeted content are described in commonly-owned U.S. patent application Ser. No. 09/558,755 filed Apr. 21, 2000, entitled "Method And System For Web User Profiling And Selective Content Delivery," which is also expressly incorporated by reference herein.

Figure 1:
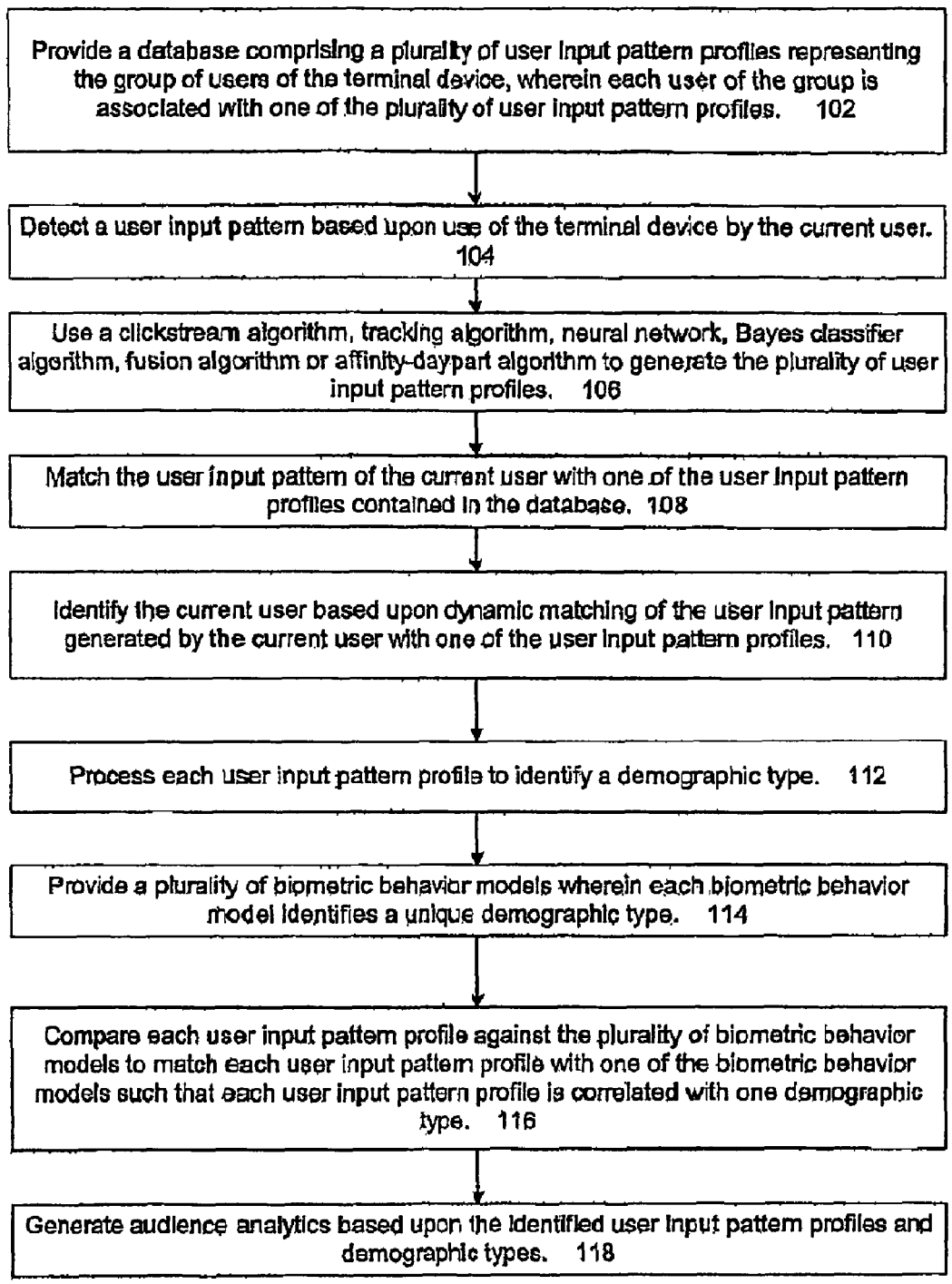
FIG. 1 is a flowchart of a method in accordance with the present invention.

FIG. 1 is a flowchart depicting an overall method of one practice of the invention. As shown therein, an overall method of generating audience analytics in a system can comprise providing a database of a plurality of user input pattern profiles that represent a group of users of a terminal device such as a computer, television, video monitor, or iTV interactive device (102). Within the group, each user is associated with one of the plurality of user input pattern profiles (102). The user input pattern profiles are detected based on the use of a terminal device such as a television, computer, or other interactive device used by the current user (104).

The method can also comprise using a clickstream algorithm, tracking algorithm, neural network, Bayes classifier algorithm or affinity-day part algorithm to generate the plurality of user input pattern profiles (106). The method matches the user input pattern of the current user with one of the user input pattern profiles contained in the database (108). The method can identify the current user based on a dynamic matching of the user input pattern generated by the current user with one of the user input pattern profiles (110).

A further practice of the invention comprises processing each user input pattern profile to identify a demographic type (112). For example, a plurality of biometric behavior models can be employed to identify a demographic type (114). The user input pattern profiles are compared against the plurality of biometric behavior models to match each user input profile with one biometric behavior models, thereby correlating each user input pattern profile with a demographic type (116). Audience analytics are generated based on the identified user input pattern profiles and demographic types (118).

Figure 2:
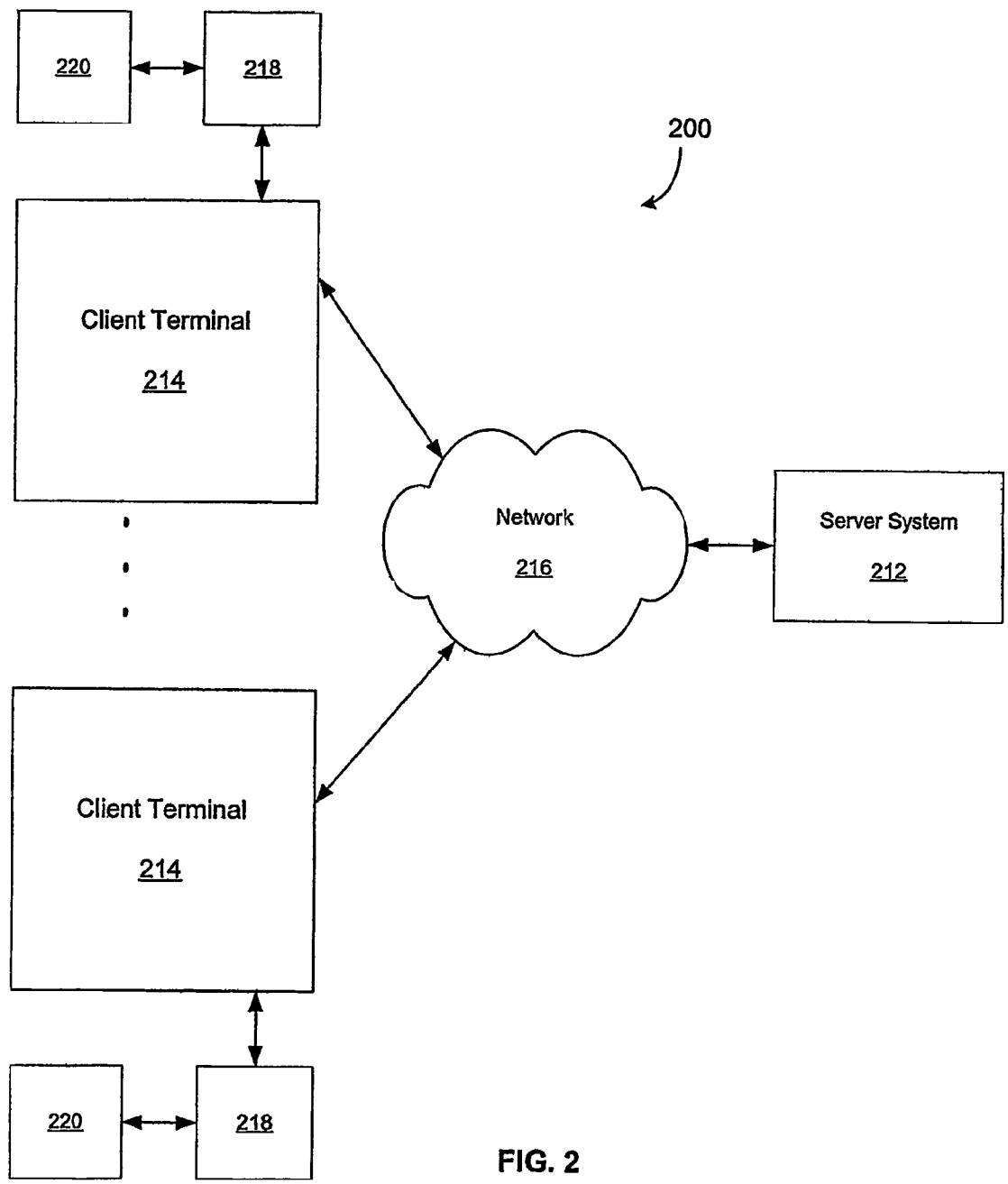
FIG. 2 depicts a content delivery system.

FIG. 2 schematically illustrates a representative network in which a system for identifying unique users can be implemented. In general, the system 200 includes a server system 212 for delivering content to a plurality of user terminals or client devices 214 over a network 216. Each user terminal 214 has an associated display device 218 for displaying the delivered content. Each terminal 214 also has a user input or interface interaction device 220 that enables the user to interact with a user interface on the terminal device 214. Input devices 220 can include, but are not limited to infrared remote controls, keyboards, and mice or other pointer devices. In some embodiments, the network 216 can comprise a television broadcast network (such as, e.g., digital cable television, direct broadcast satellite, and terrestrial transmission networks), and the client terminal devices 214 can comprise, e.g., consumer television set-top boxes. The display device 218 can be, e.g., a television monitor.

In some embodiments, the network 216 can comprise a computer network such as, e.g., the Internet (particularly the World Wide Web), Intranets, or other networks. The server system 212 can comprise, e.g., a Web server, the terminal device 214 can comprise, e.g., a personal computer (or other Web client device), and the display device 218 can be, e.g., a computer monitor.

Figure 3:
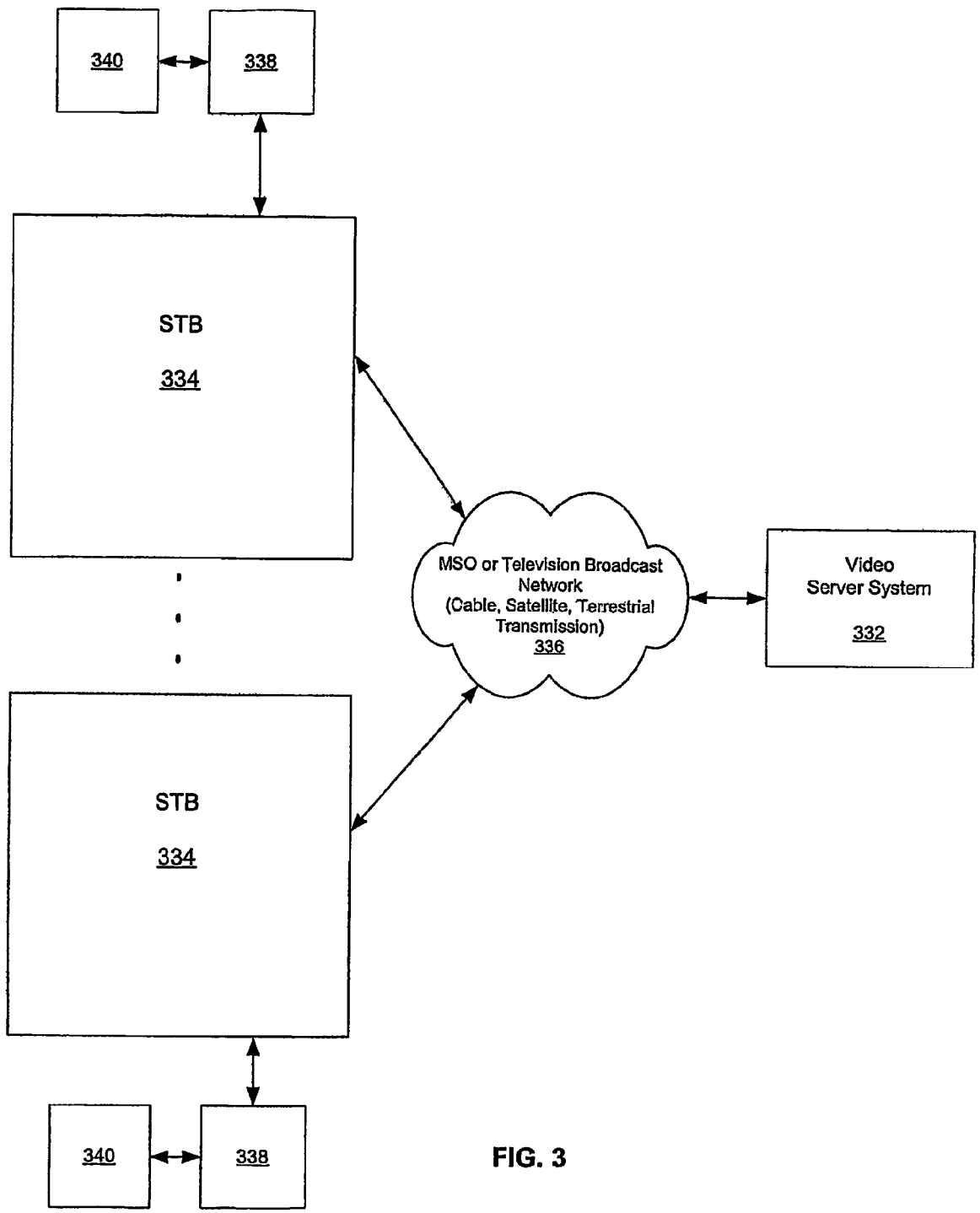
FIG. 3 illustrates a television content delivery system in accordance with the present invention.

FIG. 3 depicts an iTV system suitable for use with the present invention. As shown in FIG. 3, the network 336 can comprise a television broadcast network such as, for example, digital cable television, direct broadcast satellite, and terrestrial transmission networks), and the client terminal devices 334 can comprise, e.g., consumer television set-top boxes (STBs). The display device 338 can be, for example, a television monitor.

In some embodiments, the network 336 can comprise a computer network such as, for example, the Internet (particularly the World Wide Web), Intranets, or other networks. The server system 332 can comprise, for example, a Web server, the terminal device 334 can comprise, for example, a personal computer (or other Web client device), and the display device 338 can be a computer monitor. It should be noted that the present invention is not limited to use with television systems, but can be used in conjunction with any manner of content, or information, distribution systems including the Internet, cable television systems, satellite television distribution systems, terrestrial television transmission systems, and the like.

As illustrated in FIG. 3, the server system 332 can comprise, for example, a video server, which sends data to and receives data from a terminal device 334 such as a television STB or a digital STB.

The network 336 can comprise an iTV network that provides two-way communications between the server 332 and various terminal devices 334. The network 336 can, for example, comprise a nodal television distribution system such as a cable television network comprising, e.g., a nodal television distribution network of branched fiber-optic and/or coaxial cable lines. Other types of networked distribution systems are also possible including, e.g., direct broadcast satellite systems, off-air terrestrial wireless systems and others. The terminal device 334 can be operated by a user with a user interface interaction device 340, for example, a remote control device such as an infrared remote control having a keypad.

Television System Embodiments:

Referring again to FIG. 2, in the television system embodiments the server system 212 can comprise, e.g., a video server, which sends data to and receives data from a terminal device 214 such as a television set-top box or a digital set-top box.

The network 216 can comprise an interactive television network that provides two-way communications between the server 212 and various terminal devices 214 with individual addressability of the terminal devices 214.

The network 216 can, for example, comprise a television distribution system such as a cable television network comprising, e.g., a nodal television distribution network of branched fiber-optic and/or coaxial cable lines. Other types of networked distribution systems are also possible including, e.g., direct broadcast satellite systems, off-air terrestrial wireless systems and others.

The terminal device 214 (e.g., set-top box) can be operated by a user with a user interface interaction device 220, for example, a remote control device such as an infrared remote control having a keypad.

Internet Embodiments:

In the Internet (or other computer network) embodiments, the client terminals 214 connect to multiple servers 212 via the network 216, which is preferably the Internet, but can be an Intranet or other known connections. In the case of the Internet, the servers 212 are Web servers that are selectively accessible by the client devices. The Web servers 212 operate so-called "Web sites" and support files in the form of documents and pages. A network path to a Web site generated by the server is identified by a Uniform Resource Locator (URL).

One example of a client terminal device 214 is a personal computer such as, for example, a Pentium-based desktop or notebook-computer running a Windows operating system. A representative computer includes a computer processing unit, memory, a keyboard, a pointing device such as a mouse, and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired. The content delivered by the system to users is displayed on the screen.

Client terminals 214 typically include browsers, which are known software tools used to access the servers 212 of the network. Representative browsers for personal computers include, among others, Netscape Navigator and Microsoft Internet Explorer. Client terminals 214 usually access the servers 212 through some Internet service provider (ISP) such as, e.g., America Online. Typically, multiple ISP "point-of-presence" (POP) systems are provided in the network, each of which includes an ISP POP server linked to a group of client devices 214 for providing access to the Internet. Each POP server is connected to a section of the ISP POP local area network (LAN) that contains the user-to-Internet traffic. The ISP POP server can capture URL page requests and other data from individual client devices 214 for use in identifying unique users as will be described below, and also to distribute targeted content to users.

As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a device machine having an HTML-compatible browser (e.g., Netscape Navigator) can retrieve a Web page (namely, an HTML formatted document) of a Web site by specifying a link via the URL (e.g., www.yahoo.com/photography). Upon such specification, the client device makes a transmission control protocol/Internet protocol (TCP/IP) request to the server identified in the link and receives the Web page in return.

U.S. patent application Ser. No. 09/558,755 filed Apr. 21, 2000 and entitled "Method And System For Web User Profiling And Selective Content Delivery" is expressly incorporated by reference herein. That application discloses a method and system for profiling online users based on their observed surfing habits and for selectively delivering content, e.g., advertising, to the users based on their individual profiles.

User Identification from Behavioral Data:

Various embodiments of the invention are directed to identifying a current individual user of a client device from a group of possible users. Such identification can be made from user behavioral data, particularly from input patterns detected in use of input devices (such as keyboards, mice, and remote control devices). As will be described in further detail below, the detected input patterns from a current user are compared with a set of input pattern profiles, which can be developed over time and stored in a database for the group of possible users. The current user is identified by substantially matching the current input pattern with one of the stored pattern profiles, each of which is associated with one of the possible users.

The database of input pattern profiles and software for detecting and matching current input patterns can reside at the client terminal 214 or elsewhere in the network such as at the server 212 or at the ISP POP server, or distributed at some combination of locations.

Different types of input data patterns can be used separately or in combination for identifying current users. The various types of input data patterns can include, e.g., (1) clickstream data; (2) keystroke data; (3) mouse usage data; and (4) remote control device usage data.

In an Internet implementation, clickstream data generally relates to the particular Websites accessed by the user. This information can include the URLs visited and the duration of each visit. In a television implementation, clickstream data generally relates to television surf stream data, which includes data on the particular television channels or programs selected by a user. Keystroke data relates to keyboard usage behavior by a user. Mouse data relates to mouse (or other pointer device) usage behavior by a user. Remote control device data relates to usage behavior of a remote control device, particularly to operate a television set. For each of these types of user data, a sub-algorithm can be provided for detecting and tracking recurring patterns of user behavior.

User identification can be performed using any one of these types of user behavioral data or by combining two or more types of data. A so-called "fusion" algorithm is accordingly provided for combining the outputs from two or more of the sub-algorithms to detect unique users. Briefly, the fusion algorithm keeps track of which combinations of particular patterns from, e.g., three types of data (e.g., {click pattern "A," keystroke pattern "C," mouse pattern "F"}) recur most consistently, and associates these highly recurrent combinations with particular users.

Clickstream Behavior Tracking:

Different Web or television users have different Web/television channel surfing styles and interests. The clickstream algorithm 455 depicted in FIG. 6 and described below extracts distinguishing features from raw clickstreams generated by users during Web/online surfing or television viewing sessions. In general, recurrent patterns of behavior in various observed different clickstreams are detected and stored. Incoming clickstreams from a user client device are compared with these stored patterns, and the set of patterns most similar to the incoming clickstream pattern is output, along with their corresponding similarity scores.

During an online session, the clickstream generated by the current user can be distilled into a set of statistics so that different clickstreams can be easily compared and their degree of similarity measured. This degree of similarity can be the basis for associating different clickstreams as possibly having been generated by the same person. The following are sets of example clickstream statistics:

1) Total duration of visits to Top-N URLs or of viewing of Top-N television programs or channels.

One set of clickstream statistics can be the Top N (N can be variable, but is usually 8-10) unique URLs or channels/programs that appear in the current clickstream, selected according to total duration of visits at these URLs or of viewing of the channels/programs. The total duration is computed and stored. In addition to the Top-N unique URLs or channels/programs, a catch-all category named "Other" can also be maintained.

2) Transition frequencies among Top-N URLs or channels/programs.

Another set of clickstream statistics can be a matrix mapping "From" URLs to "To" URLs or "From" channels/programs to "To" channels/programs that captures the total number of all transitions from one URL or channel/program to the next in the clickstream. Transitions can be tracked among the Top-N URLs or channels/programs as well as those in the "Other category." In addition, "Start" and "End" URLs or channels/programs can be used along with the "From" and "To" dimensions, respectively.

These statistics can be used to form a pattern of user surfing behavior. They can capture both the content of the clickstream (as represented by the content of the Top-N URLs or channels/programs), as well as some of the idiosyncratic surfing behavior of the user (as manifested, e.g., in transition behavior and proportion of sites or channels/programs that are "Other").

User profiling can take into account the possibility that user input patterns are dependent on time. For example, in a television implementation, user viewing behavior can vary, e.g., based on the time of day or the given hour of a week.

Similarity Metrics:

The similarity of clickstreams can be measured by calculating the similarity of statistics such as those described above between two different clickstreams. There are several different possible similarity metrics that can be used in distinguishing or comparing different clickstreams. Examples of such metrics include the following:

1) Dot-product of "duration" unit vectors

Two "duration" vectors are considered to be similar if they point in the same direction in URL or channels/programs-space, i.e., each clickstream visits many of the same Top-N URLs or channels/programs in similar proportions, regardless of the actual length or duration of the clickstream. This similarity is measured by computing the dot-product between the "duration" unit vectors. Perfect similarity returns a value of unity, no similarity returns zero. The similarity of "Other" values is preferably not included in this calculation since two clickstreams with identical "Other" values might have in fact no similarity at all.

2) Dot-product of unit-vectorized "transition" matrices.

For similar reasons, the transition matrices can be compared using a dot-product metric. The matrices must first be vectorized (i.e., the elements are placed in a vector). Transitions to and from "Other" are considered generally significant and can be included in the calculation.

3) Similarity of "Other" duration.

The proportion of time spent at "Other" URLs or channels/programs relative to the total user session time can be compared. Similarity is measured by computing for each of the two clickstreams to be compared the proportion of time spent at "Other" URLs or channels/programs, then dividing the smaller of the two by the larger.

4) Similarity of total duration.

This is a measure of similarity in the total duration of the clickstreams.

5) Similarity of total number of distinct URLs or channels/programs.

This is a measure of the similarity in the total number of distinct URLs or channels/programs appearing in these clickstreams.

Each of these similarity metrics can be computed separately. If multiple metrics are used, they can be combined using various techniques. For example, a composite similarity metric can be computed by multiplying a select subset of these metrics together. Trial and error on actual data can determine which subset is most suitable. However, the similarity between duration vectors and transition matrices are likely to be more useful.

A good similarity metric will result in a good separation between users who have reasonably different surfing habits, and will not overly separate clickstreams generated by the same individual when that person is manifesting reasonably consistent surfing behavior.

Matching Clickstreams Based on Similarity:

Clickstreams that have high similarity values can be considered possibly to have been generated by the same person. There are many possible ways to compute similarity. For example, one way to match a clickstream to one of a set of candidates is to select the candidate that has the highest similarity value. This technique is called a "hard match".

Alternatively, a somewhat more conservative approach can be to select a small group of very similar candidates rather than a single match. This group of candidates can subsequently be narrowed using some other criteria. This technique can be called finding a "soft match". A similarity threshold can be specified for soft matching. Soft matching is preferable when it is desired to match users according to multiple input pattern types such as keystroke and mouse dynamics in addition to clickstream behavior.

Figure 4:
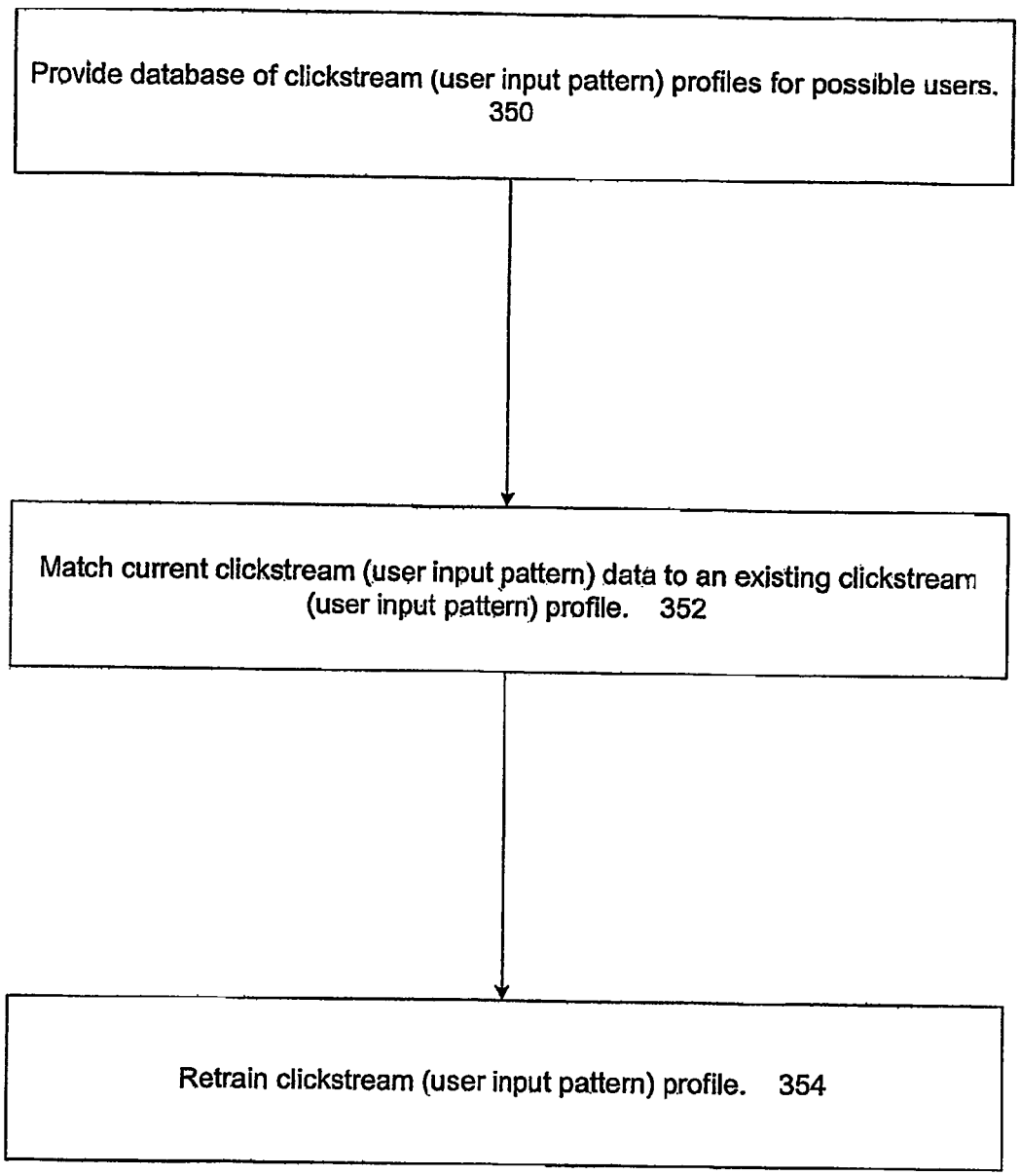
FIG. 4 is a flowchart illustrating the algorithm for matching a current clickstream with a stored clickstream in accordance with the present invention.

The Tracking Algorithm:

It is desirable to match incoming clickstreams with stored clickstream profiles representing recurrent clickstream patterns that have been observed over time. Each user is preferably associated with a single clickstream pattern profile. However, because an individual may have multifaceted interests, he or she may alternatively be associated with multiple clickstream pattern profiles. The process of matching incoming clickstreams with existing pattern profiles can be as follows as illustrated in FIG. 4.

A set of recurrent clickstream profiles is created and stored in a database as indicated in step 350. It is expected that for a single client terminal there will be multiple different observed clickstreams generated by usually a small set of individual users, each of whom may have several different strong areas of interest that manifest in their surfing behavior. These can be represented as a set of clickstream pattern profiles that summarize the content and surfing behavior of most or all the observed clickstreams.

A clustering algorithm, e.g., can be used to generate a small set of clickstream pattern profiles to cover the space of observed clickstreams. New clickstream profiles can be added whenever a new (i.e., dissimilar to existing profiles) clickstream is observed. Old profiles can be deleted if no similar incoming clickstreams have been observed for a given period of time. The growth/pruning behavior of the algorithm can be moderated by a similarity threshold value that determines how precisely the profiles are desired to match incoming clickstreams, and thus how many profiles will tend to be generated.

The next step in the matching process is to dynamically (i.e., on-the-fly) match an incoming (i.e., current) clickstream to existing clickstream profiles as shown in step 352. As a clickstream is being generated by a user, the partial clickstream can be compared on-the-fly at generally any time with the existing set of stored clickstream profiles. A hard or soft match can be made in order to determine the identity of the current user.

Next, the stored clickstream profiles are preferably retrained with data from completed clickstream as indicated in step 354. Upon termination of the current clickstream, the set of clickstream profiles is preferably retrained to reflect the latest clickstream observation. Clickstream profiles can be adjusted according to their similarity to the current clickstream.

Keystroke Behavior Tracking:

Another type of distinguishing user input pattern relates to the typing styles or keystroke dynamics of different users. Different users have different typing styles. A keystroke dynamics algorithm is accordingly provided to capture these different styles so that they may be associated with unique users.

The keystroke algorithm can be similar to the clickstream algorithm described above. The process can generally include the following steps:

1) Statistics on current keyboard activity occurring concurrently with the current clickstream are compiled.

2) A set of keystroke profiles based on past observations of keyboard activity for a given terminal device are created and stored in a database.

3) The current keyboard activity is compared to the set of keystroke profiles to predict the user identity.

4) The keystroke profiles are preferably updated with the current keyboard activity once it has terminated.

Keystroke statistics can comprise a vector of average behavior that can be tested for similarity to other such vectors. The keystroke profiles for users can be created and trained in a similar manner as clickstream profiles. In addition, on-the-fly matching (hard or soft) of keystroke profiles to current keyboard input can be done in a similar manner as for clickstream matching.

One type of keystroke statistic that is particularly efficient and useful for characterizing typing behavior is the "digraph" interval. This is the amount of time it takes a user to type a specific sequence of two keys. By tracking the average digraph interval for a small set of select digraphs, a profile of typing behavior can be constructed.

The following is a list of frequent digraphs used in the English language (with the numbers representing typical frequency of the digraphs per 200 letters):

| | | |
|---|---|---|
| TH 50 | AT 25 | ST 20 |
| ER 40 | EN 25 | IO 18 |
| ON 39 | ES 25 | LE 18 |
| AN 38 | OF 25 | IS 17 |
| RE 36 | OR 25 | OU 17 |
| HE 33 | NT 24 | AR 16 |
| IN 31 | EA 22 | AS 16 |
| ED 30 | TI 22 | DE 16 |
| ND 30 | TO 22 | RT 16 |
| HA 26 | IT 20 | VE 16 |

Several of the most frequent digraphs can be selected for use in each keystroke profile. It is preferable that the digraphs be selected such that substantially the entire keyboard is covered.

Mouse Dynamics Tracking:

There is generally an abundance of mouse (or other pointing device) activity during a typical Web browsing session, making it useful to characterize user behavior according to mouse dynamics alone or in combination with other user input behavior.

Similar to keystrokes, the statistics collected for mouse dynamics can form a vector that can be compared for similarity to other such vectors and can be input to an algorithm such as a clustering algorithm to identify recurring patterns.

Mouse behavior can include pointer motion and clicking action. The following are some examples of possible mouse usage statistics that can be gathered.

For clicking action, the average double-click interval can be determined. This can be the average time it takes a user to complete a double-click, which can be as personal as a keystroke digraph interval.

Also, for user clicking action, the ratio of double- to single-clicks can be determined. Much Web navigation requires only single-clicks, yet many Web users have the habit of double-clicking very frequently, which can be a distinguishing factor.

For user pointer motion behavior, the average mouse velocity and average mouse acceleration statistics can be distinctive characteristics of users. Motion is preferably gauged as close to the hand of the person as possible since mouse ball motion is generally a more useful statistic than pixel motion.

Furthermore, the ratio of mouse to keystroke activity can also be a useful distinguishing characteristic of users. Some people prefer to navigate with the mouse, while others prefer use of a keyboard.

The algorithm for matching current mouse dynamics statistics with stored mouse usage profiles can be similar to that described above with respect to the clickstream algorithm.

Other Input Device Usage Tracking:

Various other user input behavior can be used for determining unique users. For example, in the television embodiments, user input patterns can be determined from usage of devices such as infrared remote control devices. The following are examples of various usage characterizing patterns for such devices. These include (1) the length of time a button on the remote control device is depressed to activate the button control; (2) the particular channels selected for viewing; (3) the digraphs for selecting multi-digit channels; (4) the frequency of use of particular control buttons such as the mute button; and (5) the frequency with which adjustments such as volume adjustments are made.

The algorithms for matching statistics such as these to stored input profiles can be similar to those previously described.

The Fusion Algorithm:

Multiple independent sources of user information (clickstream, keystroke, mouse and any other input data) can be available, each having a corresponding algorithm that tracks recurring patterns in the input data. The existence of a set of unique users can be inferred from significant associations among these recurring input patterns. For example, a certain individual will tend to generate a particular keystroke pattern, a particular mouse pattern, and one or possibly several clickstream patterns. By detecting that these patterns tend to occur together and making an association, the existence of a unique user can be inferred.

Figure 5:
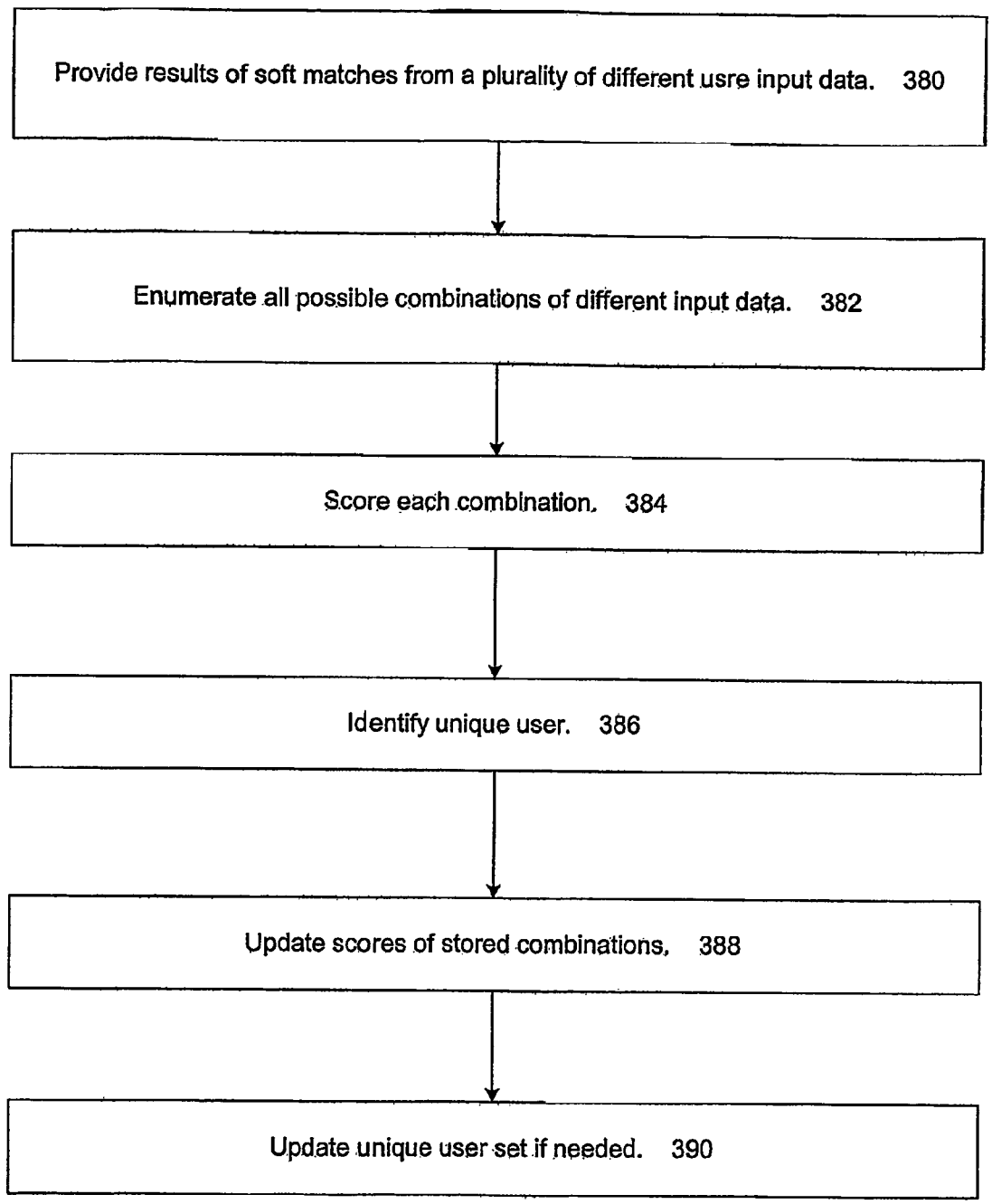
FIG. 5 is a flowchart illustrating the fusion algorithm in accordance with the present invention.

A "fusion" algorithm, which is generally illustrated in FIG. 5, is provided to track associations among recurring patterns, to determine which patterns are significant, and to assign unique user status to those that are most significant. In addition, the fusion algorithm manages the addition and deletion of unique users from the system.

As previously described, each individual algorithm (e.g., for clickstream, keystroke, and mouse usage data) can perform a soft match between the current input data and its set of tracked patterns, and returns a list of most similar patterns along with their respective similarity scores as shown in step 380. For example, the clickstream algorithm might return the following set of matched pattern data for clickstream data: {(pattern "2,"0.9), (pattern "4,"0.7), (pattern "1,"0.65)}, where the first entry of each matched pattern data indicates the particular matched pattern, and the second entry indicates the similarity score for that match.

The fusion algorithm tracks the frequency of recurrence of each possible combination of patterns among multiple individual algorithms. For example, a possible combination can have the form: {click pattern "c," key pattern "k," mouse pattern "m"}. If there are a total of C click patterns, K keystroke patterns, and M mouse patterns being tracked, then the total number of tracked combinations is C*K*M, which can be up to, but not limited to, a few hundred assuming the number of keystroke and mouse patterns is about 5, and the number of clickstream patterns is about 10.

Given a soft match from each of the tracking algorithms, a complete set of associations can then be enumerated in step 382 and scored in step 384. Enumeration creates all the possible combinations. For each combination, a score is computed, which can be the product of the similarities of the members of the combination. It is not required that the score be the product of all the similarities; the score can also be based on various other possible combinations.

An on-the-fly unique user identification can be made as shown in step 386. The individual matching algorithms generate on-the-fly soft matches to current input data, which is then be used by the fusion algorithm to perform a hard match to its existing set of unique users to identify the current user.

Once the current user is identified, it is possible to effectively deliver to the user targeted content such as, e.g., targeted advertising or program viewing recommendations. The fusion algorithm can then update the frequencies of recurrence for the enumerated combinations. One possible way of doing this would be by adding the current score of each particular combination to its previous cumulative score as indicated in step 388. It is preferable to decay all existing scores prior to applying the updates, so that infrequent or inactive patterns are weighted less heavily.

Unique users can be associated with patterns whose scores stand out significantly from the rest. After every update of combination scores, the fusion algorithm can determine if any additions or deletions from the current set of inferred unique users is indicated as shown in step 390. A new user can be added if the score of some combination exceeds a given threshold. An existing user can be deleted if the score of the corresponding combination falls below a given threshold. These thresholds are relative to the magnitudes of the entire set of scores, and represent degrees of "standing out" among all the combinations.

Before an addition occurs (entailing the creation of a new profile), it is preferably determined whether or not the presumed new user in fact corresponds to an existing user. Since there is the possibility that an individual user could manifest more than one type of clickstream behavior, a new user having the same keystroke and mouse behavior of an existing user can be associated with the existing user, since keystroke and mouse behaviors are more likely to correlate strongly with individual users compared to clickstream behavior.

If an addition and a deletion occur at about the same time, it is possible that a particular user has simply "drifted", in which case that profile should be reassigned rather than being deleted and a new personal profile created.

While the embodiments described above generally relate to identifying or tracking individual users of client terminals, they can be applied as well to identifying recurring groups of such users. For example, television viewing at various times is performed by groups of individuals such as, e.g., by a husband and wife or by a group of children. These combinations of individuals could manifest distinct behavior.

For cases in which the system is unable to identify a user (or group of users) with a sufficient degree of certainty, the user could be designated as "unknown" and an average user profile for the terminal device could be assumed.

Figure 6:
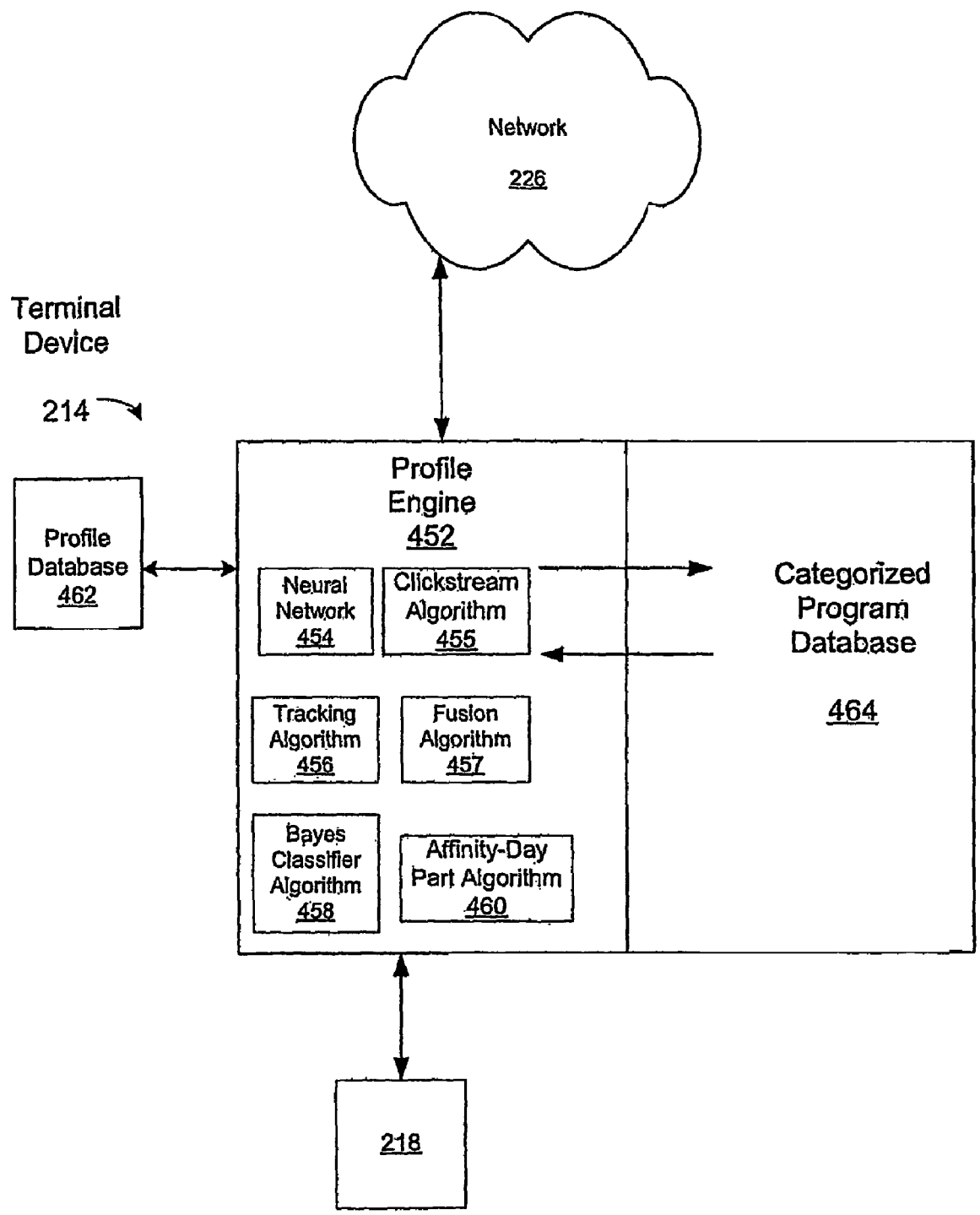
FIG. 6 illustrates a content delivery system including a profile engine in accordance with the present invention.

Profile Generation:

In the present invention, user profile information may contain, but is not limited to, demographic data (such as, for example, the user's age, gender, income, and highest attained education level), psychographic data that can reflect the user's interests or content affinity (such as, for example, sports, movies, music, comedy), geographic data, and transactional data. Referring to FIGS. 2 and 6, a profile engine 452 first receives data at the terminal device 214 as the result of a user interaction with the client device. Typical user interactions comprise those interactions previously described in the television and Internet embodiments, for example, changing the channel, turning the client device on or off, viewing show information through the programming guide, responding to interactive surveys, surfing the Web or sending e-mail, among other things.

Figure 9:
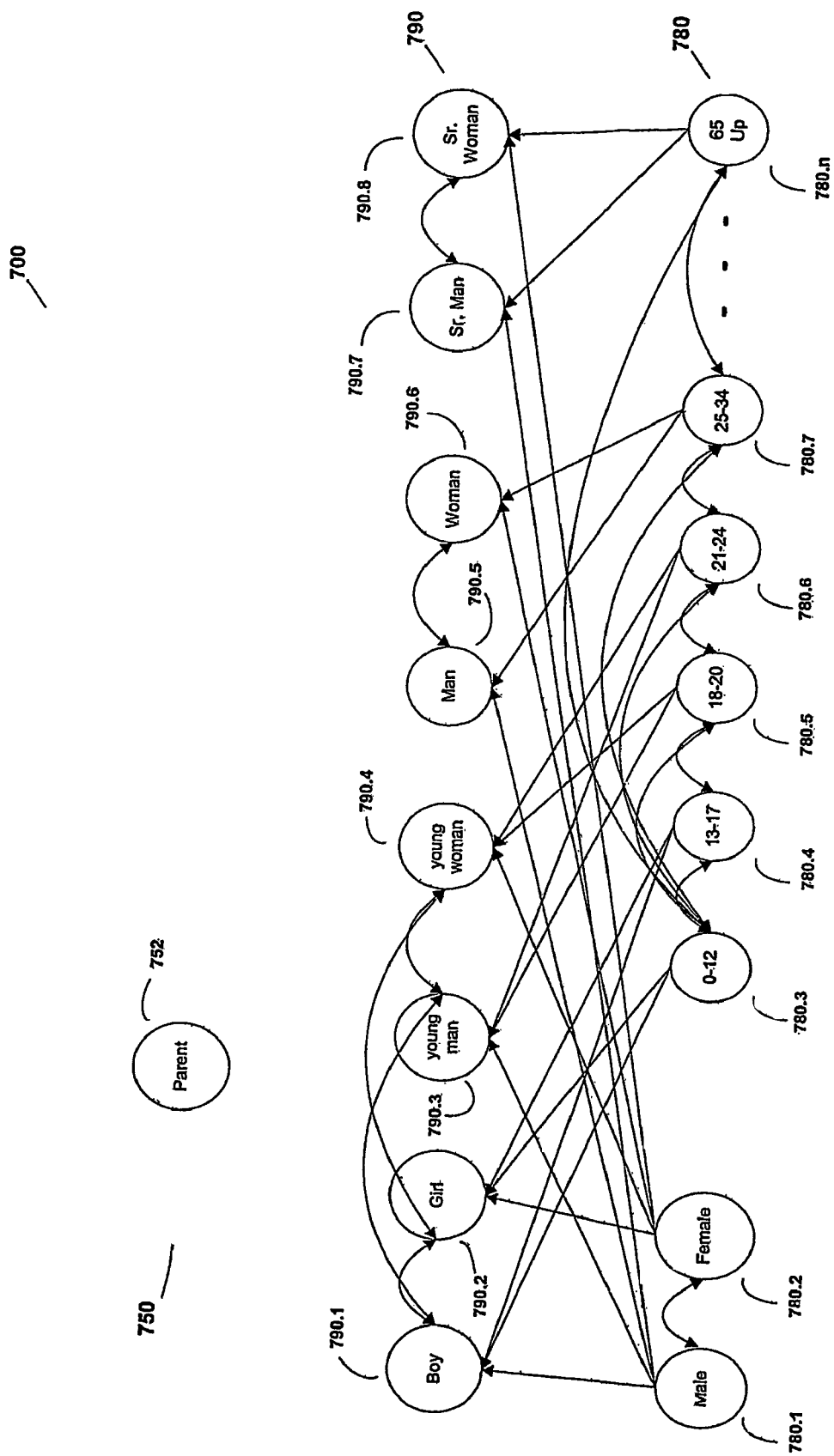
FIG. 9 depicts the functional structure of a neural network in accordance with the present invention.

The profile system is composed of several stages. As shown in FIG. 9, the first stage can comprise a neural network 454 that processes viewing information to determine the makeup of a household or user demographics. Alternative approaches to the neural network would be to use the clickstream algorithm 455, the tracking algorithm 456, the fusion algorithm 457, a Bayes classifier algorithm 458 or an affinity-day part algorithm as shown in FIG. 6. In some domains the performance of a Bayes classifier algorithm has been shown to be equivalent to that of a neural network or decision tree. A Bayes classifier algorithm classifies a new instance by combining the prediction of all demographic hypotheses weighted by their posterior probabilities. In the case of the Bayes classifier algorithm, a given instance would be household X and one possible hypotheses would be that household X contains a person between the ages of 25 and 34. Other hypotheses would correspond to the other age groups. For each age group estimates of conditional probabilities based on Nielsen data or our own sample audience are obtained. The demographics of interest may include, but are not limited to, gender, age, income, education, and occupation. In another aspect of the invention, the Bayes classifier algorithm can be used to determine the age of different members of a household.

Referring again to FIG. 6, the demographics of interest may include, but are not limited to, gender, age, income, education and occupation. In another aspect of the invention, the neural network 454 can be used to determine the age and gender of different members of a household. Alternatively, the neural network 454 of the present invention can determine household demographics as well as the demographics of individuals within a household.

As shown in FIG. 6, the profile engine 452 analyzes a user's viewing pattern by extracting programming data as it comes into the terminal device 214. Next, the profile engine 452 cross-references the program data with data in a local categorized program database 460 that contains known demographic information from a selected list of television programs. The previously categorized demographic information may be obtained from entities such as A. C. Nielsen, which profiles television programs using panels of users having known demographic characteristics. In another embodiment, previously identified demographic information can be created by sampling a subset of the client's deployments. The programs selected for the list are indicative of the user(s) belonging to a particular demographic group, such as gender or age. In a further practice of the invention, television or Web site profiles available from, e.g., A. C. Nielsen or Nielsen NetRatings, are stored in the categorized database 460. These profiles are classified along multiple psychographic and demographic categories. As an example, the following 84 psychographic and 37 demographic categories can be used:

Demographic Categories
Gender:
Male
Female
Age:
0-11
12-17
18-20
21-24
25-34
35-49
50-54
55-64
65-99
Income:
0-24,999
25,999
50,999
75,999
100,000
150,000 and up
Education:
Some High School
High School Graduate
Some College
Associates Degree
Bachelor's Degree
Post Graduate
Occupation:
Administrative
Craftsman
Educators
Executive
Laborer
Homemaker
Military
Professional
Sales
Service
Student
Technical
Self-employed
Retired
Race:
Hispanic
Non-Hispanic
African American
Caucasian
Asian
Native American
Psychographic Categories
Travel:
Air
Car Rental
Lodging
Reservations
Maps
Finance/Investments:
Banking
Brokers
Quotes
Insurance
Mortgage
Sports:
Auto Racing
Baseball
Basketball
Fantasy Sports
Football
Hockey
Soccer
Golf
Tennis
Recreation & Hobbies:
Cycling Golf
Hiking
Sailing
Snow Sports
Surfing
Tennis
Home & Garden
Pets
Genealogy
Photography
Games
Toys
Entertainment:
Movies/Film
Music
Theater
TV/Video
Sci-Fi
Humor
Games
Toys
Auto:
Trucks
SUV
Sports car
News and Information:
Magazines
Weather
Politics:
Democrat
Republican E-shopping:
Groceries
Furniture
Auctions
Cards/Gifts
Apparel
Books
Music
TV/Video
Software
E-purchasing
Computers
Software
Science
Employment
Education
Health & Fitness
Medical
Pharmacy
Dating/Single
Advice
Beauty
Weddings
Maternity
Spirituality/Religion
Astrology
Discount Luxury
Child
Teens
College Age
Over 18
Spanish Language Referring now to FIG. 2, each action with the interface interaction device 220 during, for example, a visit to a Web site or an iTV interaction having a stored profile, the profile is averaged or combined into the user's profile. The profiles include a rating in each category that reflects the interest in the category of persons who access the Web site or carry out the iTV act.

Each rating is accompanied by a confidence measure, which is an estimate of the accuracy of the rating. The confidence number is determined by analyzing the Web site/iTV act and rating it on the type and specificity of content, with narrower and more singular content providing a higher confidence number. When the confidence measure in a particular category is below a predetermined threshold, information from other user profiles is preferably used to provide a more accurate rating in a process referred to as "profile completion."

An example of a user's profile is shown below. The first number in each category indicates the rating for that category. The ratings number is a percentage of a maximum rating, representing the degree of the user's affinity to the category. In the example below, the ratings number ranges from 0 to 100 with higher numbers indicating greater affinity. The second number in each category (in parenthesis) represents the confidence level in the rating for that category.

TABLE 1

| | | | User Profile | | | | | |
|---|---|---|---|---|---|---|---|---|
| User ID | Sports | Finance | Movies | Music | TV | ... | Health | Gardening |
| 1 | 10.0 (.75) | 25.0 (.15) | 0.0 (1.00) | 0.0 (.28) | 0.0 (1.00) | ... | 50.0 (.77) | 85.0 (.82) |

Suppose the confidence threshold is defined to be 0.50 such that confidence is insufficient in any rating that has a confidence measure less than 0.50. For the user profile in the example table shown above, there is insufficient confidence in the ratings for the finance and music categories. In this situation, the system examines profiles of users with similar profiles to improve the accuracy of the ratings in those categories with low confidence measures.

A clustering algorithm can be used to find profiles that are similar to the profile of the current user. In judging the similarity between profiles, the confidence measures are ignored and the profiles are treated as n dimensional ratings vectors. A simple clustering algorithm is used based on the distance between vectors wherein all users whose profiles are within a certain distance of the subject user profile are collected. Then, the weighted average of all of the profiles in the collection is calculated to get an ideal profile for comparing to the subject user profile. If the ideal profile has a rating for the category in question that has an acceptable confidence measure, then this rating (and the accompanying confidence measure) replaces the corresponding rating in the subject user profile.

In this way, parts of the user profile that have low confidence ratings are "completed" or "filled-in." An example is shown below in Table 2.

TABLE 2

Group similar profiles to generate an ideal profile
to be used to complete the user's profile

| User ID | Profile | |
|---|---|---|
| 1 | 10.0 (.89), 21.0 (.75), 0.0 (1.00), 17.0 (74), 0.0 (1.00), | 52.0 (.64), 95.0 (.90) |
| 2 | 12.0 (.77), 5.0 (.15), 0.0 (1.00), 12.0 (.85), 0.0 (1.00), . . . | 40.0 (.84), 90.0 (.75) |
| 3 | 11.0 (81), 20.0 (.77), 0.0 (1.00), 0.0 (1.00), 0.0 (1.00), . . . | 75.0 (.77), 81.0 (.73) |
| 4 | 10.0 (.56), 25.0 (.68), 4.0 (.27), 11.0 (.77), 0.0 (1.00), . . . | 55.0 (80), 85.0 (.85) |
| 5 | 12.0 (75), 22.0 (.77), 0.0 (1.00), 10.0 (.83), 2.0 (.30), . . . | 60.0 (.41), 80.0 (45) |
| Ideal profile | 11.0 (76), 21.1 (.62), 0.9 (.85), 9.4 (.84), 0.5 (.86), . . . | 55.8 (.69), 87.1 (74) |

In the example above, the ideal profile is calculated in the following manner. The rating for each category in the ideal profile is calculated by multiplying the rating times the confidence measure for each user. These products are then added across users in each category. This sum is then divided by the sum of the confidence measures added across users in the category. In mathematical terms, $R_{ideal,j} = \Sigma R_{ij} C_{ij} / \Sigma C_{ij}$, where $R_{ideal,j}$ is the rating for the ideal profile in category j, $R_{ij}$ is the rating in category j for user i, $C_{ij}$ is the confidence measure in category j for user i and the sum is taken over i as i ranges from 1 to n, which is 5 in the example. The confidence measure for each category in the ideal profile is calculated by taking the average of the confidence measure across users in the same category, $C_{ideal,j} = \Sigma C_{ij} / n$, where $C_{ideal,j}$ is the confidence measure for category j in the ideal profile, $C_{ij}$ is the confidence measure in category j for user i, and the sum is taken over i as i ranges from 1 to n, which is 5 in this example.

The ideal profile is used to complete the subject user profile. In the example described above, there was insufficient confidence in the ratings for the user in the finance and music categories. Users having similar profile ratings to the user were found to have a finance category rating of 21.1 with a confidence measure of 0.62. Since the confidence threshold was defined to be 0.50, it is possible to use the ideal profile finance rating of 21-1 (0.62) to replace the user's finance category rating of 25 (0.15). Similarly, the music category rating for similar user profiles was found to have a rating of 9.4 with a confidence measure of 0.84. This is greater than the threshold and is used to complete the subject user profile. The music category computation illustrates how the system is able to advantageously infer that the user may have an interest in the category despite the fact that he or she has not visited any Web sites related to that category. The completed subject user profile now appears as follows:

TABLE 3

'Completed' User Profile

| User ID | Sports | Finance | Movies | Music | TV | Health | Gardening |
|---|---|---|---|---|---|---|---|
| 1 | 10.0 (.75) | 21.1 (62) | 0.0 (1.00) | 9.4 (.84) | 0.0 (1.00) | 50.0 (.77) | 85.0 (.82) |

Figure 7:
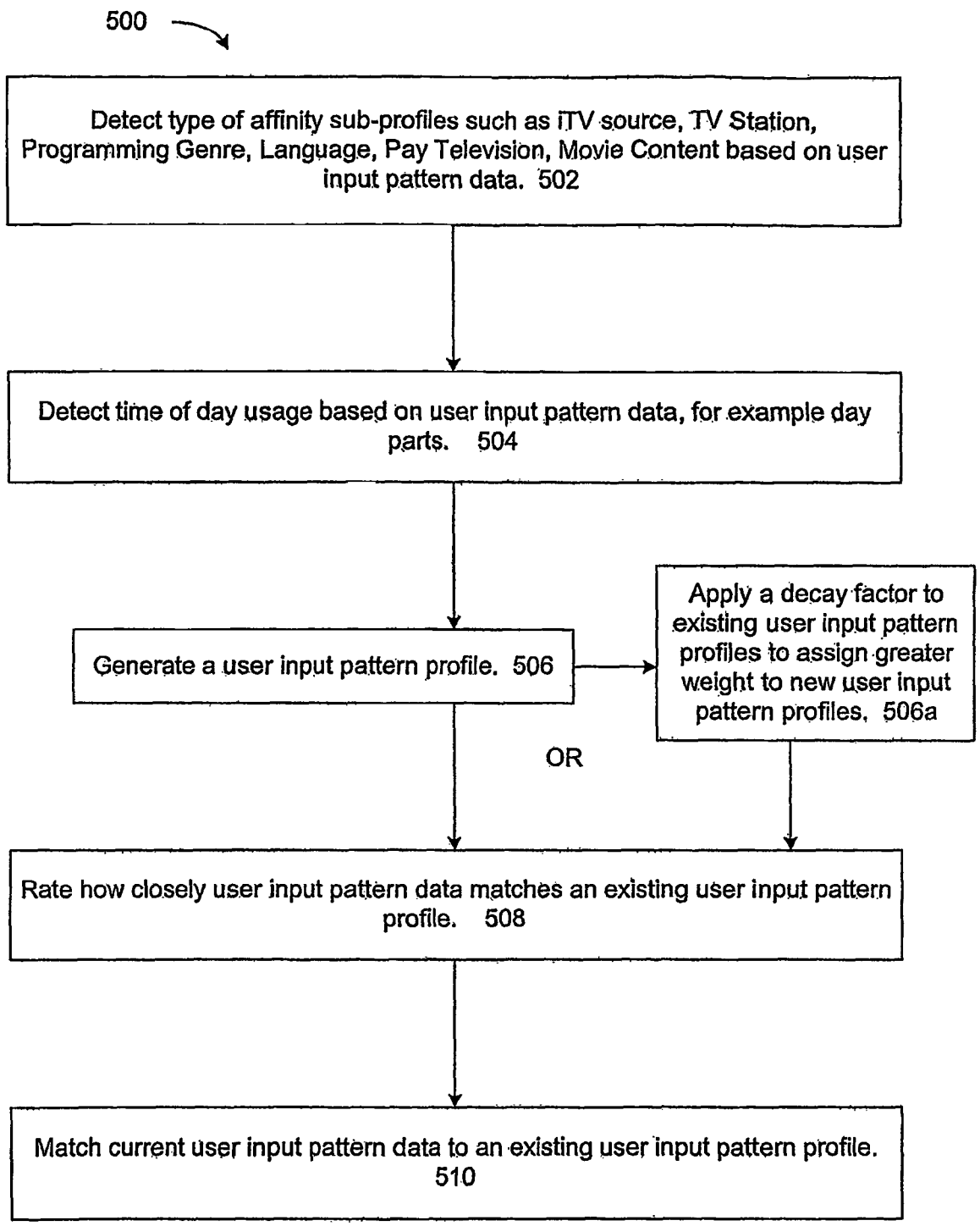
FIG. 7 is a flowchart illustrating an affinity-day part algorithm in accordance with the present invention.
Figure 8:
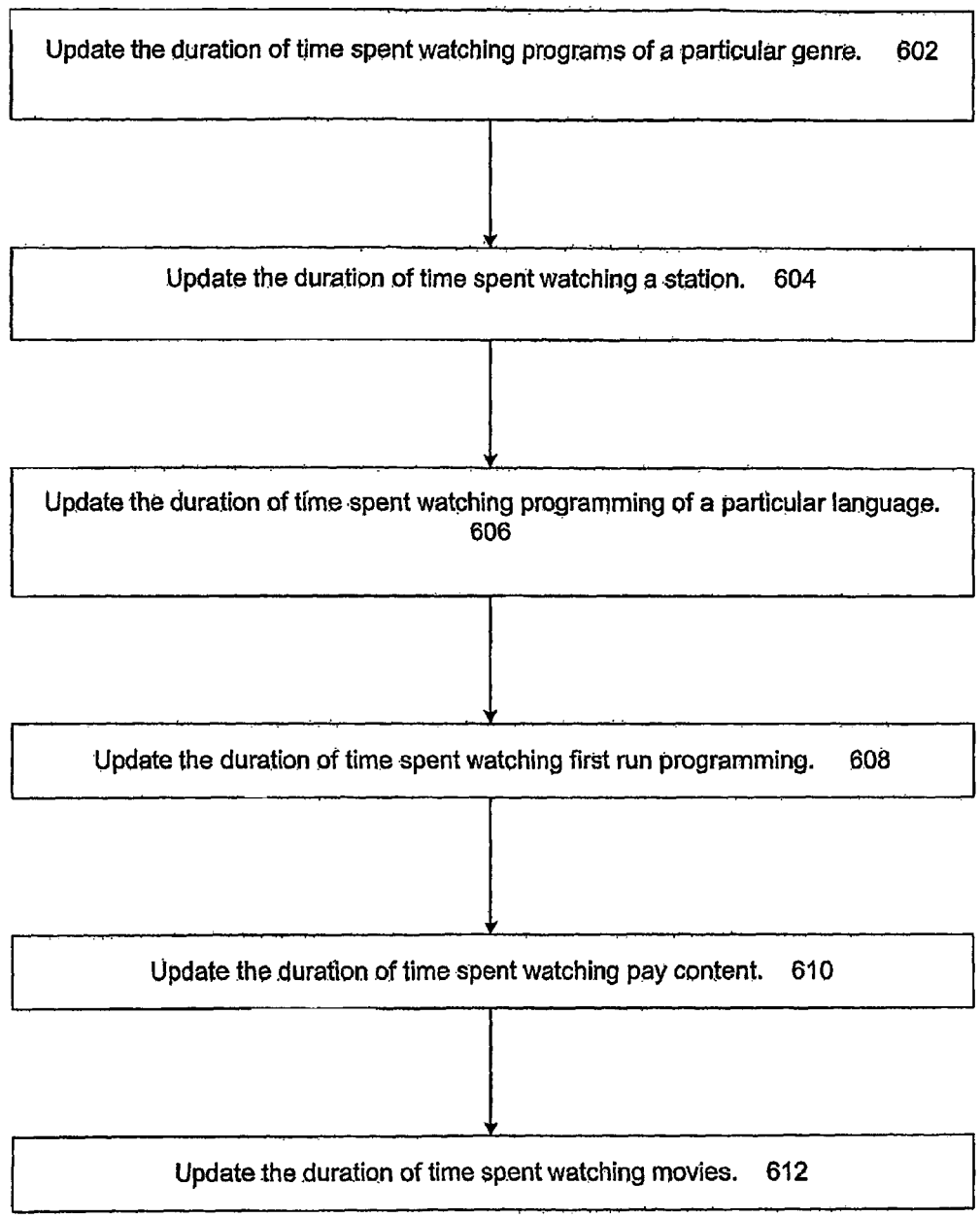
FIG. 8 is a flowchart depicting the updating of the affinity-day part algorithm in accordance with the present invention.

Affinity-Day Part Algorithm:

In another practice of the invention illustrated in FIGS. 7 and 8, user input pattern profiles are generated by detecting a user's types of affinities and time of day input data. In this embodiment, a profile is a data structure, which can be the model of terminal device behavior, such as an STB, in which affinities are summed over time. In one implementation, multiple sub-profiles are broken down in two ways: type of affinity and time of day. The type of affinity can correspond to a television station, programming genre, language, pay television, or movies.

As shown in FIG. 7, an affinity-day part algorithm 500 comprises affinity sub-profiles and day parts. The affinity sub-profiles include, for example, iTV source, TV station, programming genre, language, pay content, or movie content and are detected based on user input pattern data as indicated in step 502. The time of day user input pattern data is inputted is also detected as shown in step (504). Based on the type of affinity sub-profiles and time of day user input pattern data, an input pattern profile is generated as indicated in step 506. In a further embodiment, a decay factor is applied to existing user input pattern profiles to assign greater weight to new user input pattern profiles as shown in step 506a. The system rates how closely user input pattern data matches an existing user input pattern profile as indicated in step 508 and matches current user input pattern data to an existing user input pattern profile as shown in step 510.

The movie affinity is separate from the programming genres. There is no movie genre in the programming genres. The time of day portion of the profile corresponds to different day parts. For each day part a user may have several (non-zero) genre affinities, station affinities, and language affinities. The user may have only one movie affinity and one pay television affinity. These numbers can represent the percentage of time the user watches programming of that type during the day part. The day parts used with genre affinities can be defined as follows:

1. Weekdays 6 a.m.-9 a.m.
2. Weekdays 9 a.m.-3 p.m.
3. Weekdays 3 p.m.-6 p.m.
4. Weekdays 6 p.m.-8 p.m.
5. Weekdays 8 p.m.-11 p.m.
6. Weekdays 11 p.m.-2 a.m.
7. Weekdays 2 a.m.-6 a.m.
8. Fridays 8 p.m.-11 p.m.
9. Fridays and Saturdays 11 p.m.-2 a.m.
10. Saturdays and Sundays 2 a.m.-6 a.m.
11. Saturdays 6 a.m.-12 noon.
12. Saturdays 12 noon-8 p.m.
13. Saturdays 8 p.m.-11 p.m.
14. Sundays 6 a.m.-12 noon
15. Sundays 12 noon-8 p.m.
16. Sundays 8 p.m.-11 p.m.

The day parts used with station affinities can be the same as the day parts used for genres with the exception that day part 5 (primetime weekdays) has been broken down into individual days to achieve greater accuracy in the recommendations.

17. Mondays 8 p.m.-11 p.m.
18. Tuesdays 8 p.m.-11 p.m.
19. Wednesdays 8 p.m.-11 p.m.
20. Thursdays 8 p.m.-11 p.m.

The numbering scheme reflects how the day parts can be numbered in the database. Day parts 1-16 can be used with genre affinities and day parts 1-4, 6-20 can be used with station affinities. For both sets of affinities there can also be an additional sub-profile to which all events are added representing the average behavior of the STB over all time periods. This is the average profile or average day part and is represented by the number 0 in the database. This average sub-profile is used for rating items when enough information isn't available within a specific day part.

A viewing event for a channel causes the duration to be added to the particular channel's sum in the day part and the overall sum in the day part. The same is then repeated in the average day part. There is a minimum duration for a viewing event to cause the profile to be updated. In one practice, viewing events greater than 10 seconds are considered. This filters out tuning events caused by channel surfing. The viewing event may only affect the sums for the given channel. The information for the genres is handled similarly, except that the possibility exists for an item to have multiple genres. Shows with compound genre, i.e. RealityAdventureDrama, are split into single genres. Data supplied by Tribune Media Service (TMS), a television program guide data supplier, can order the genres listed for a program so that the first genre listed is the most relevant to the program, the second genre listed is second most relevant and so on. This information can be used to attribute the viewing time in a weighted fashion that is proportional to the order of in which the genres are listed. Since it is unclear how much more the first genre should be weighted compared to the second and so on, a fairly conservative method is employed to easily maintain normalization of the categories. The formula for distributing the viewing time of a program among the various genres of the program is as follows: (# of genres for the program−the index of current genre+1)/(sum of the index for all the genres of the program) where the index of each genre reflects the order in which it was listed. So if the RealityAdventureDrama" show was watched for 30 minutes, instead of crediting the 30 minutes to one genre or crediting 30 minutes to each genre or even crediting 10 minutes to each genre, the household is credited proportionally for each of the individual categories.

In this example, there are 3 genres for the program, the index for each genre reflects the order in which it is listed (Reality—index 1, Adventure—index 2, Drama—index 3), and the sum of the indexes is 6. Therefore the 30 minutes of viewing time will be distributed among the three genres in the following way:

Reality−weighting=(3−1+1)/6=0.5, 0.5*30=15 minutes, Adventure−weighting=0.33, 0.33*30=10 minutes, and Drama−weighting=0.16, 0.16*30=5 minutes.

Referring to FIG. 8, a flowchart depicting updating affinity sub-profiles, the duration of time spent watching programs of a particular genre, as indicated in step 602, comprises:
Duration(Genre i, User j, Day Part k)=Duration(Genre i, User j, Day Part k)+((#genres for current program−index of current genre+1)/(sum of index for all genres of current program))*viewing duration of current program.

Updating the duration of time spent watching a station, as shown in step 604, can be more directly calculated since a user may only watch one station at a time. For example, the duration of time spent watching a station, shown in 604, can comprise:
Duration(Station i, User j, Day Part k)=Duration(Station i, User j, Day Part k)+viewing duration of current program, where current program was viewed on station i during day part k.

The genre sum can be kept separate from the channel sum so that items without one type of information will not dilute the information for the other (i.e. shows without genres will not dilute the ratings of all genres). As with channels, the genres' average day part sub-profile is updated the same way as the specific day part sub-profile.

The user's language profile is used to act as a filter that allows us to only recommend programs in a language that the user is familiar with. The language of a program can be determined by checking the "ProgramLanguage" field in the Program table. Referring again to FIG. 8, updating the duration of time spent watching programming of a particular language, as indicated in step 606, is similar to the duration update for stations described above and comprises:
Duration(Language i, User j, Day Part k)=Duration(Language i, User j, Day Part k)+viewing duration of current program, where current program was viewed in language i during day part k.

In this example, there are separate from genre, station, and language are three other affinities that typically don't have subcategories: first run, pay, and movie. The "First Run" affinity is created to act as a filter that allows us to not recommend re-runs to users who don't like to watch re-runs. For each program that is watched, it can be determined if it is a re-run by checking the "Repeat" field in the Schedule table. Alternatively, the "Original Air Date" field in the Program Table can be checked to determine if it is earlier than the current airdate.

Step 608 of FIG. 8 depicts updating the duration of time spent watching first run programming, similar to the duration update for stations described above and can be stated as:
Duration(First Run, User j, Day Part k)=Duration(First Run, User j, Day Part k)+viewing duration of current program, where the current program is not a repeat.

The "Pay" affinity is created to act as a filter to help us determine which users might be interested in receiving recommendations for pay content such as PPV or VOD. Over time this category will reflect PPV movies as well as VOD. To determine that a channel is PPV, the "servicetier" field can be selected in the Channel table. A value of 4 can denote PPV.

As shown in FIG. 8, updating the duration of time spent watching pay content is similar to the duration update for stations described above and comprises:
Duration(Pay, User j, Day Part k)=Duration(Pay, User j, Day Part k)+viewing duration of current program, where the current program is pay content.

The "Movie" affinity is different from the genre affinities in order to create separate user profiles for movies. Additionally, the movie affinity differs from the movie profile, which will be discussed in detail below. The movie affinity measures the user's interest in watching movies during a given day part. The movie profile contains detailed information into what types of movies the user, likes to watch. The movie profile has been separated out from the other profiles to improve the quality of making movie recommendations, particularly for VOD and PPV. When the user's movie affinity score is above threshold for a given day part, then the user's movie profile will be used to recommend movies. In order to determine if a program is a movie, the "Program Type" field in the Program table can be used. Typically, all programs of program type "MV" are movies. In order to track feature films instead of made for TV movies, the program type "MV" can be used where the field "MadeForTV" in the Program table is equal to 'N'.

Referring to FIG. 8, updating the duration of time spent watching movies is similar to the duration update for stations described above and comprises:

Duration(Movie, User j, Day Part k)=Duration(Movie, User j, Day Part k)+viewing duration of current program, where the current program is a movie and is not "MadeForTV".

Referring now to step 506a of FIG. 7, in one embodiment a profile can be aged so that after a certain period the existing profile will be begin to decay and the new data will have greater weight. As a result, two ways of generating genre and station scores can be employed. For the first part of the profiling (before decay begins) the scores are generated much in the same manner as in previous implementations. The scores are based on the duration spent on a category divided by the total duration. Examples of this for Genre and Station comprise the following:

Score(Station i, User j, Day Part k)=Duration(Station i, User j, Day Part k)/Total Viewing Duration for Day Part k Score(Genre i, User j, Day Part k)=Duration(Genre i, User j, Day Part k)/Sum across all Genres: Duration(Genre i, User j, Day Part k), where Duration(Genre i, User j, Day Part k) is defined as above.

Score(Language i, User j, Day Part k)=Duration(Language i, User j, Day Part k)/Total Viewing Duration for Day Part k Score(First Run, User j, Day Part k)=Duration(First Run, User j, Day Part k)/Total Viewing Duration for Day Part k Score(Pay, User j, Day Part k)=Duration(Pay, User j, Day Part k)/Total Viewing Duration for Day Part k Score(Movie, User j, Day Part k)=Duration(Movie, User j, Day Part k)/Total Viewing Duration for Day Part k The scores can be calculated in this way for the first 20 hours of television viewing within each day part (except for day part 0, the average profile, which will be calculated this way for the first 120 hours of television viewing). After which the day part profiles will begin to decay. The profiles that may decay are the Genre profile and the station profile. Language, First Run, Pay, and Movie affinities do not decay. The values of 20 and 120 are parameters that may be selectively changed. The scores during the decay period (after the 20 hour limit has been reached) are:

Score(Genre i, User j, Day Part k)=(1−df*Wg)*Score(Genre i, User j, Day Part k)+df*Wg and for all n not equal to i, Score(Genre n, User j, Day Part k)=(1−df*Wg)*Score(Genre n, User j, Day Part k)

These two steps will result in normalized Genre Scores, i.e. the total of all genre scores will always be 1 for each day part. The parameter df is a decay factor that is currently given a value of 0.4 but may be modified after testing. In general the df value for the average day part (day part 0) will probably be different than the df value for the other day parts. The weighting factor Wg=(viewing duration of current program attributed to Genre k/program duration), where viewing duration attributed to genre k is determined as described in the previous section. Similarly for stations, Score(Station i, User j, Day Part k)=(1−df*Ws)*Score(Station i, User j, Day Part k)+df*Ws and for all n not equal to i, Score(Station n, User j, Day Part k)=(1−df*Ws)*Score(Station n, User j, Day Part k) where Ws=(viewing duration of current program/program duration). The values of df are the same as in the genre equations.

In implementing the affinity-day part algorithm 500, it is not necessary to update the total hours of viewing after the 20 hour limit has been reached. However, information regarding the actual total hours of viewing can be kept. If the program duration information needed in calculating the weighting factors (Wg and Ws) is difficult to obtain, the viewing ratio can be replaced by different values for events <10 minutes, <20 minutes, <30 minutes, etc with the value being 1 after a certain number of minutes.

The profiling methods described above when combined with the rating system described below produces accurate recommendations for programs on stations that the user has watched before. Users habits can be expanded by recommending: (1) programs on stations the user has never watched; (2) programs, particularly movies, to the user that occur on pay channels (PPV or VOD); or (3) subscription channels that the user is not currently subscribed to. This can be accomplished by using clustering methods described in the ratings section below in order to recommend programs on stations that the user has never viewed but that are similar to the user's preferred stations. Additionally, with the advent of VOD and PPV, there will be a wide array of movies available to users that aren't associated with any particular station.

As shown in FIG. 7, a user input pattern profile relating to, for example, movie content must be generated in order to rate movies unrelated to stations is the creation of a movie profile. The movie profile is similar to the Station and Genre profiles created above to the extent the same day parts are used. The movie profile can consist of the following categories: Era, Distributor, Genre, and Star-rating.

For example, there are eight movie eras: the silent era (pre-1927), the pre-WWII era (1927-1940), the golden era (1941-1954), the transition era (1955-1966), the silver era (1967-1979), the modern era (1980-1995), and the post-modern era (1996-present). The era of a film can be determined by selecting the "ReleaseYear" field from the Program table. In cases where the release year field is 'NULL', the movie has not been released and should be treated as a regular program and not as a movie.

Many movie distributors exist, but only about a dozen major ones. The distributor can be determined by selecting the "DistributingCompany" field from the Program table. Some of the movies in the TMS database do not have a distributor listed. However, when there is a distributor listed it is a useful piece of data that will be used when it is available. For example, most films available on PPV and VOD have distributors, therefore tracking this data will become more relevant as PPV and VOD content is recommend.

The Genre categories are the same as the genres used in the regular profile. As in the previous genre profiles, the genre can be retrieved from a program genre table. The star rating measures the quality of the movie and can be retrieved from the "StarRating" field of the Program table. The star rating is stored as a varchar and is converted to a float.

The genre scores in the movie profile will be generated in the same way as the genre scores described above with the exception that instead of viewing events having to be greater than 5 minutes in length for the score to be updated the viewing events have to be greater than 5 minutes in length in the case of the Movie profile. This is true for all of the categories that comprise the Movie profile. These may not be updated unless the viewing event is greater than 20 minutes. Updating the genre scores in the movie profile comprises:

Score(Genre i, User j, Day Part k)=Duration(Genre i, User j, Day Part k)/Sum across all Genres: Duration(Genre i, User j, Day Part k), where Duration(Genre i, User j, Day Part k) is defined as above.

The star rating score that accompanies each genre score will be the average star rating for all movies of that genre can be stated as:

Score(Star Rating Genre i, User j, Day Part k)=Sum (Star Rating Genre i, User j, Day Part k)/Sum (# of Movies of Genre i, User j, Day Part k)

The distributor score will be the time spent viewing movies of a given distributor divided by the total time spent viewing movies for a given day part. The scores for eras are also calculated similarly and comprise:

Score(Distributor i, User j, Day Part k)=Duration(Distributor i, User j, Day Part k)/Total Movie Viewing Duration for Day Part k Score(Era i, User j, Day Part k)=Duration(Era i, User j, Day Part k)/Total Movie Viewing Duration for Day Part k In a further practice, the minimum viewing time for an event to be added to the profile is set to 1 second (i.e. no cutoff), settable with the code. Additionally, station IDs are linked to channel affinities so that if there is a change to the channel lineup the user will still get the correct recommendations. If the system does not have direct access to the station Ids on the set top box then, the channel information is combined with unique keys. Additionally, genre durations can be weighted when being recorded to the profile in the order they appear in the data listings.

As shown in FIG. 7, rating an item determines how closely that item matches the profile and assigns a numerical value representing that degree of closeness. Typically, the values do not carry units and are meaningful in relation to the values of other items. Higher values mean a closer (i.e. "better") match. The total rating of an item is calculated based on the determined match score for its channel and genres.

Before ratings are generated there are several factors that filter out programming that is either inappropriate to recommend or of no interest to the user. In one practice, programs of the genre "Adults Only" can be given a rating of 0 and will not be recommended. If the program is an R-rated movie and it airs before 8 p.m., it can be given a rating of 0. The rating of a movie can be found by using the MPAARating field in the Program table. If the program is "paid programming" then it can be given a rating of 0. This can be determined from the "ShowType" field in the Program table. If the programming language does not match one of the languages for which the user has a language affinity above threshold (0.05) then the program can be given a rating of 0. If the "First Run" affinity of the user for a given day part is above the first run threshold (0.6), then all repeats in the given day part will be given a rating of 0. If the "Pay" affinity of the user for a given day part is less than the pay threshold (0.4) then all pay events in the given day part will be given a rating of 0. If the program occurs on a premium channel and the user's score for that station is zero, then the program will be given a rating of 0.

In general the rating for a program for a particular user or household can be determined by multiplying the Genre score and Station score in the user profile that matches the genre and station of the program for the appropriate day part. The ratings are calculated in a five-stage process. During the movie stage, ratings are generated for movies that might not be showing on stations the user normally watches. During the favorite programs stage the program must match both the station affinity and genre affinity of the user for the current day part. In the favorite stations stage, the station scores from the current day part can be used to generate ratings. In the behavior expanding stage, a clustering algorithm can be used to recommend non-movie programs occurring on stations the user doesn't usually watch. In the fill-in stage, the station scores from the average profile can be used to generate ratings. Constants are added at various stages to ensure that the ratings reflect the relevance of the programming. At each stage a boosting factor is introduced for shows (non-movies) that are premieres or finales. This can be determined by checking the "premierfinale" field in the Program table. Programs that are premieres or finales have their ratings boosted by adding 0.2 to their rating if they already have a non-zero rating. Premieres or finales for programs that don't match the user's interests are not boosted.

When a program has multiple genres, the genres can be treated as a series of individual genres ("Action", "Adventure", "Comedy") or they can be treated as a compound genre ("ActionAdventureComedy") or as a combination of both ("Action", "Adventure", "Comedy", "ActionAdventureComedy"). For simplicity and to conserve on space, each of the genres is treated individually. So the first genre listed is generally the one that best describes the show and the second genre listed is second best, etc. To account for this an index for the genres can be created that correspond to the position in the listing. This index can be used to weight how much that genre will contribute to the program rating. The genre score then contributes to the program rating in the following way:

Genre portion of program rating=(Program Genre Score k)× (User Genre Score k) for all k where Program Genre Score k=(#genres for current program−index of current genre+ 1)/(sum of index for all genres of current program) and User Score k is>threshold and Genre k is a genre of the current program.

Station portion of programming rating=(User Station Score k), for all k where User Station Score k is>threshold and Station k is a station of the current program. The current threshold value for both station and genre scores is 0.05.

So for the favorite programs stage the rating is:

Program rating=2+(Genre portion×¼)+(Station portion×¾) where the portions are calculated using the day part profile of the user that corresponds to the day part during which the current program airs. This first stage is designed to recommend shows that users watch most frequently. This stage applies to all non-movie programming. If a program is a movie and the user has a movie affinity that is above threshold then it is rated in the next stage.

The movie stage can take place if the user has a Movie affinity in the current day part that is above threshold. This stage allows us to make recommendations for movies on stations the user doesn't normally watch. In this case, the user's movie profile can be used for the day part in question. The rating is generated from the distributor, era, and genre scores and the star scores are used as filters. The station scores from the regular profile are used as boosting mechanisms.

The star filter works in the following manner. A movie will not be recommended if it contains a star rating that is more than half a star below the user's rating score for the genre of the film.

Program rating=1+(((Genre portion)+(Era score)+(Distributor score))/3), where the Genre portion is calculated in the same way as the Genre portion for non-movie programming described above.

If the movie is occurring on a station that the user has an above threshold score for the current day part then adding 1 to it boosts the program rating. This will put the program rating on a par with the program ratings generated in the favorite programs stage.

In the favorite stations stage of the process, programs that did not receive a rating during the first stage are given a rating if the program station matches a station for which the user has a score above threshold in their day part profile. Program rating=1+Station portion where Station portion is calculated using the day part profile of the user that corresponds to the day part of the program being rated. The value of 1 is included in the equation to insure that the ratings generated in this stage are always higher than the ratings generated in the final stage. This stage is designed to recommend programs on the users favorites stations for a given day part. The programs may or may not have been viewed previously by the user The behavior expanding stage uses clustering to recommend non-movie programs on stations the user has never watched. All of the stations are clustered based on the type of content available on the stations across a month's worth of TMS data. The clusters are further refined using a group of TV experts to ensure the quality of the clusters. Ratings are generated based on the user's station scores for the current day part. Any non-network station scores above the cluster threshold of 0.1 will be used to generate ratings for new stations in the same cluster. The station with a score above 0.1 is referred to as an "Ideal Station" in the equations. Since there are often many stations within each cluster, there may be many programs to choose from. In order to maintain a careful balance between new and old shows, one program can be chosen from a given cluster to recommend. The program will be chosen among stations that have user score below threshold (0.05) for the day part, i.e. the station has rarely been viewed by the user during this day part. This part of the process uses feedback. The first time this behavior expanding rating process occurs, stations that the user has never or rarely watched before are selected based on the genre score for the program. Each time a new station is recommended, a record is kept that it has been chosen. The next time the system is in this stage of the ratings, only stations that have never been viewed (station score below threshold) and which have not been previously recommended more than the limit (currently set at 5) are chosen. Out of these available stations, the program with the highest genre score is chosen. If there is a tie, the program is selected at random. By using a station score threshold that is above zero and a limited number of recommendations greater than 1, this builds up the rating for a new station to the point where recommendations will be generated on the basis of being a regularly watched program rather than a station that has never been watched. In this manner, behavior can be influenced and stations moved from "never been watched" to "regularly viewed". The rating for the program is generated using the genre score for the program and the station score of the ideal station.

Program rating=1+(Genre portion×¼)+(Ideal Station portion×¾) where the portions are calculated using the day part profile of the user that corresponds to the day part during which the current program airs and the Ideal Station portion>0.2 and the Station of the chosen program has a Station score below threshold and has not been recommended more than the limit.

In the fill-in stage of the process, programs that did not receive a rating during the first two stages are given a rating if the program station matches a station for which the user has a score above threshold in their average profile (day part 0).

Program rating=Station portion, where Station portion is calculated using the day part 0 profile of the user.

This final stage recommends program on the user's favorite stations across all day parts. The programs may or may not have been viewed previously by the user. If after all of this there are still not enough ratings, the ranker will address the issue either by filling the remaining slots with the remaining channels listed in numerical order.

Neural Networks:

Referring to FIGS. 1 and 9, a neural network can generate a plurality of user input pattern profiles and identify a current user based on matching for example, viewing of the program "Bear in the Big Blue House" may be indicative that there is a young child present in the household. Suppose the average audience for "Bear in the Big Blue House" has the following demographic values: Male=0.374, Female=0.626, Age 0-12=0.624, Age 13-17=0.014, Age 18-20=0.036, Age 21-24=0.041, Age 25-34=0.126, Age 35-49=0.081, Age 50-54=0.022, Age 55-64=0.039, Age 65+=0.019. Viewing "Bear in the Big Blue House" would provide evidence that the household contains at least one female and a child under the age of 12. The only other possible demographic indicator is Age 25-34=0.12. If this demographic value is greater than the average for the sample, it might be concluded that viewing this show can also be indicative of the presence of an adult in the household. Combined with the fact that children rarely live in a household without a parent, one could conclude from this one piece of viewing information that the household contains a child under the age of 12 and an adult between the ages of 25 and 34. Additionally, one could conclude that the parent is most likely to be the mother given the high Female rating for the program.

Referring now to FIG. 9, depicted is a neural network 700 for processing profile data. The neural network 70 can contain three layers. A first layer 780 is an input layer with nodes 780.1-780.$n$ corresponding to exemplary demographic categories. In the embodiment illustrated by FIG. 9, "n" can represent a single digit or double-digit integer. However in other circumstances, "n" can also represent an infinite number of nodes.

The nodes 780.1-780.$n$ in the first layer 780 are fully recurrent (each node is connected to every other node) within each demographic category. This means that within a category the nodes compete with each other. Nodes that receive excitatory inputs inhibit the activity of neighboring nodes so that only the nodes receiving the most excitation remain active and are able to spread their activity to a second layer 790 of the neural network 700.

By way of example, the second layer 790 of the network comprises nodes 790.1-790.8 that correspond to combinations of age and genres: boy, girl, young man, young woman, man, woman, old man, old woman, etc. The second layer 790 may contain more nodes or less nodes depending on the granularity of data available at level one. Thus if more age groups of finer granularity exist at the first layer 780, then more classification nodes at the second layer 790 can exist. The second layer nodes 790.1-790.8 are also fully recurrent within categories.

The nodes at the second layer 790 comprise inhibitory connections to all of the other nodes. However, unlike the inhibitory connections at the first layer 780, the connections at the second layer 790 will be pruned through training of the network. As the neural network 700 trains, the network will learn that many of the classifications in the second layer 790 are not in competition with each other. For example, evidence for the presence of a boy in the household is not negative evidence for the presence of a girl, since it is possible to have both a boy and girl present in the same household. Therefore during training, the inhibitory connections between boy and girl will be pruned away. However, inhibitory connections between other classifications may continue to exist.

As illustrated in FIG. 9, a third layer 750 exists as a relationship layer that receives inputs from the second layer 790 and accumulates evidence for the relationships that occur between the members of the household. The third layer 750 depicts the resulting relationship: parent-child (since you can't be a parent without having a child) that is represented by a node 752 labeled "parent". If the exemplary nodes 790.1-790.8 in the second layer 790 have strong excitation for man or woman nodes and the boy or girl nodes, then the parent relationship node in the third layer 750 will become active. Alternatively, if only the second layer 790 existed, one could print out all of the individuals to a database and determine how many parents exist based on the individual's database.

In addition to the lateral and feed forward connections in the neural network 700, there are also feedback connections. For example, once a parent-child node becomes active this node can send feedback to the corresponding classifications in the second layer 780 to strengthen the connections. Furthermore, nodes 790.1-790.8 in the second layer have connections to the first layer 780 that enables age calculation to occur more precisely than a general classification of "adult male".

Example Using Neural Network:

Referring to FIGS. 6 and 9, assume a trained version of the neural network 700 embedded in a profiling engine in a new household. In this new household the viewing event is watching the program "Bear in the Big Blue House". Using the same data as before, the nodes in the first layer 780 corresponding to "female", "0-12", and "25-34" would become excited. Depending on the level of inhibition between the nodes for "0-12" and "25-34" the nodes might both remain active or only the "0-12" node could remain active. For the sake of this example, assume both nodes remain active. At the second layer 90, the nodes for "girl" and "woman" will become active and in turn the nodes will activate the relationship node at the third level 100 that corresponds with "parent" node 752.

Assume the next viewing event is "Economic News" and the demographic values are Male=0.82, Female=0.18, 0-12=0, 13-17=0, 18-20=0.01, 21-24=0, 25-34=0.88, 35-49=0.02, 50-54=0, 55-64=0, and 65+=0.08. In this example, the "male" and "25-34" nodes would become active at the first layer 780, stimulating the "man" node at the second layer 790, which in turn would stimulate the "parent" node 752 at the third layer 750 based on the previous evidence for a child. Thus after two viewing events, the household now appears to have a mother, father, and young girl.

The neural network 700 will run constantly, continually examining viewing data as it comes in and updating the household profile. As households age and the individual demographics change, the household profile will be updated to reflect those changes.

In an alternative approach to the neural network, a Bayes classifier algorithm can be employed since the performance of a Bayes classifier algorithm has been shown to be similar to that of a neural network or decision tree. In this embodiment, the instance of a new user input pattern profile is classified by a Bayes classifier algorithm by combining the prediction of all user input pattern data hypotheses weighted by their posterior probabilities. In this practice, a given instance would be household X and one possible hypotheses would be that household X contains a person between the ages of 25 and 34. Other hypotheses would correspond to the other age groups. For each age group the Bayes classifier algorithm comprises estimates of conditional probabilities based on A. C. Nielsen data or another sample audience.

Referring to FIG. 9, the previous neural network example described above included the conditional probability of the household that watched "Economic News" having a person between the ages of 25 and 34 is 0.88 (expressed mathematically as P(25_34/Economic News)=0.88).

And much in the same way that the neural network has a layer to capture relationships in typical family compositions, using a Bayes classifier algorithm, the conditional probabilities above can be enhanced by adding information based on the known probabilities of family composition derived from census data. Thus, if there is a high probability of person between the ages of 0 and 5 being in the household based on user input pattern data or user viewing patterns, then this information can be combined with conditional probabilities from census data to (P(24_35/0_5)=0.58) to determine the probability that there is an adult between the ages of 24 and 35 in the household.

Determining Who's Watching Content:

Referring to FIGS. 1 and 6, a neural network 454, a clickstream algorithm 455, tracking algorithm 456, fusion algorithm 457, Bayes classifier algorithm 458, or affinity-day part algorithm 460 generates a reliable representation of a household (for example, this may occur after about 40 hours of viewing). The household information determined by the neural network 454, clickstream algorithm 455, tracking algorithm 456, Bayes classifier algorithm 458, or affinity-day part algorithm 460 can be combined with clickstream and biometric data using fusion algorithm 457 to determine which household members watched each program. As shown in FIG. 6, the profiling engine 452 receives user input data such as viewing events or Web site usage and feeds the user input data to a neural network 454, clickstream algorithm 455, tracking algorithm 456, Bayes classifier 458, or affinity-day part algorithm 460 while simultaneously building up household profiles in a profile database 462. The fusion algorithm 457 can process both the viewing events and Web site usage to generate user input pattern profiles, as previously discussed.

The present invention can employ profiling techniques that partition the viewing week up into day parts and creating multiple profiles for each one. An example of a day part would be prime time weekdays, defined as Sunday-Thursday 8 p.m.-11 p.m. Particular day parts have distinct differences in the programming watched by various age groups (kids and adults) that provide a better probability of determining the household makeup by analyzing the viewing at these day parts instead of looking at overall patterns. For example, a morning day part is dominated by two distinct types of programming watched by two distinct groups: animation and kids' shows watched by children and news programs watched by adults.

Referring to FIGS. 1, 4 and 6, if the demographic value(s) for a program request made by a user matches an existing user profile, then the matching program request and user profile are combined to create an updated inferred user profile using an averaging algorithm. If however, the demographic for the program request does not match any of the existing profiles for the same day part, then a new profile is created for the current day part. For example, assume the first program viewed by the household is "Bear in the Big Blue House" for 23 minutes on Monday at 8 a.m. with the program demographic values given above. The following new profile would be created comprising the same profile as the program.

TABLE 4

Household Profile

| Anonymous ID | Day Part | Female | Male | Gender_Duration | 0-12 | ... | 25-34 | ... | Age Duration |
|---|---|---|---|---|---|---|---|---|---|
| 1 | Weekdays 6-9 a.m. | .626 | .374 | 23 | .624 | ... | .126 | ... | 23 |

Continuing with this example, assume the next program viewed is "Economic News" for 20 minutes at Tuesday at 7 a.m. with the program demographic values given above. In this instance, the current information would not match the existing profile for the day part and the following new profile would be created, as shown in Table 5 below.

TABLE 5

Household Profile

| Anonymous ID | Day Part | Female | Male | Gender_Duration | 0-12 | ... | 25-34 | ... | Age Duration |
|---|---|---|---|---|---|---|---|---|---|
| 1 | Weekdays 6-9 a.m. | .626 | .374 | 23 | .624 | ... | .126 | ... | 23 |
| 2 | Weekdays 6-9 a.m. | .82 | .18 | 20 | .00 | ... | .88 | ... | 20 |

If the current information matches an existing program, then the profile is updated using the neural network 454, clickstream algorithm 455, tracking algorithm 456, Bayes classifier algorithm 458 or affinity-day part algorithm 460 shown in FIG. 6 that provide a weighted average of the existing user profile data and the data gathered in the current viewing session. For example, the new user profile data equals the existing user profile data multiplied by the viewing duration plus the new data multiplied by the current viewing duration, all divided by the total viewing duration. The resulting new user profile can be expressed by the following:

New user profile=(existing user profile X viewing duration+current demographics X current viewing duration)/(total viewing duration).

categorized program database 464 comprises programs that are only indicative of certain demographic categories, for example, the household may watch a program in the database that is only indicative of gender, but is age neutral. In this instance, only the age portion of the profile will be updated and the other portions will remain unchanged.

For each viewing of a program having a stored profile, the program profile is averaged or combined into the user's profile. The profiles include a rating in each category that reflects the probability that there is a member of that demographic category in the household who accessed the television program. An example of an update when the given information matches an existing profile is given in Table 6 below. In this example, assume the household profile is currently the same as in the previous table and the household views "Adventures of Winnie the Pooh" for 17 minutes and which has the following demographics: Male=0.40, Female=0.60, Age 0-12=0.64, . . . , Age 25-34=0.08 . . . For this example, the current data would match the profile for user 1 and the profile would be updated as in Table 6 below.

TABLE 6

Household Profile

| Anonymous ID | Day Part | Female | Male | Gender_Duration | 0-12 | ... | 25-34 | ... | Age Duration |
|---|---|---|---|---|---|---|---|---|---|
| 1 | Weekdays 6-9 a.m. | .615 | .385 | 40 | .631 | ... | .107 | ... | 40 |
| 2 | Weekdays 6-9 a.m. | .82 | .18 | 20 | .00 | ... | .88 | ... | 20 |

Referring again to FIG. 6, television program profiles available from, for example, A. C. Nielsen are stored in the local categorized program database 464. In one practice of the present invention, the database comprises a selectively chosen list of shows whose Nielsen data are highly indicative of either a particular age group or gender group. The list is balanced so that it is not biased toward any particular age or gender group (i.e. if a list of 100 programs had 70 shows that were indicators of "maleness" then an inordinate percentage of the profiles generated would be male).

In another embodiment, the present invention may track viewing durations for each demographic category since the With the continued use of the present invention, the profile engine 452 of FIG. 6 will create multiple profiles. Concurrently, the neural network 454, clickstream algorithm 455, tracking algorithm 456, Bayes classifier algorithm 458, or affinity-day part algorithm 460 will continue to determine the makeup of the household, thereby enabling the profile engine to prune away all profiles that don't match the household makeup. The next step in the present invention is to combine these individual profiles with user input pattern data such as clickstream behavior and biometrics to determine which profile is active at any given time.

In accordance with biometric practices, it is known that there are distinct differences in the usage of, for example, a remote control that fall along demographic lines. Biometrics demonstrates that the frequency with which button press events occur can be used to distinguish between males and females. For example, male users press remote control buttons at a much greater frequency than females. The speeds with which remote control buttons are pressed also distinguish between the relative ages of individuals within the household. Additionally, the time that elapses between when the button is pressed and released is much shorter for children and teens then it is for middle aged or older adults.

These differences are expressed in Tables 7 and 8 below.

TABLE 7

Button Press Frequency (number of presses per minute)

| MALE | FEMALE |
|---|---|
| Fast | Slower |

TABLE 8

Button Press Speed (Up/Down time)

| CHILD | ADULT | SENIOR |
|---|---|---|
| Fast | Medium | Slow |

Continuing with our current example, assume that only two distinct profiles exist for the Weekday 6-9 a.m. day part—one for a male between the ages of 25 and 34 and one for a female between the ages of 0 and 12. If a viewing event occurs between the hours of 6-9 a.m. during a weekday, it can be assumed the viewing event belongs to one of the two profiles known to exist for this time period. Thus, if two distinct profiles are known for a day part and one profile is an adult male and the other profile is a female child, a difference in button press speed will exist during the corresponding viewing session.

Referring to FIG. 6, it is sometimes the case that there are not enough clickstream events during the viewing of a given program to determine viewership. In this instance, the profile engine 452 can process clickstream events across a viewing session rather than on a show-by-show basis. By processing a viewing sessions for several programs, a sufficient amount of clickstream events will occur to effectively employ biometrics.

In addition to the application of biometric data, other data may be processed by profile engine 452 and existent in the categorized program database 464 depicted in FIG. 6, thereby enabling the systems and methods of the present invention to distinguish among users. For example, if a news program is being viewed then an adult male is doing the viewing and not a female child. By employing day part profiles that accurately reflect the percentage of time that different members of the household are watching, the system and methods of the present invention can predict which member of the household is watching at any given time.

In a further example, the present invention achieves improved accuracy in overall audience measurement by employing probabilities in a day part profile and assigning a percentage of viewership for a program. For example, assume the profile for the day part in which the program airs was Male=0.75 and Female 0.25. Processing the count of gender viewership of the program would be incremented by 0.75*viewing duration for the Male count and 0.25*viewing duration for the female count.

Weighting Factors:

Another aspect of the present invention system applies a weighting factor to the audience analytics to distinguish between two users of the same type. For example, if a household includes two boys 5 and 7 years old respectively, the profile engine could have recognized only one boy in the household. This undercounting is avoided by using a weighting factor, derived from a sample of users with known demographic values. Based on this sample, the amount of undercounting can be calculated and used as a weighting factor to generate accurate audience analytics for the population at large. Implementation of such a weighting scheme will be readily understood by those skilled in the art of audience measurement.

The present invention is not limited by the examples described above, and variations on the practices described can be used. As mentioned earlier, the granularity in the categories used by the neural network as well as the profile engine can be adjusted as needed. Additionally, the demographic data obtained either from A. C. Nielsen/Nielsen Media Research or generated through a sub sample of users from the MSO, may be replaced with other programming data such as genre data and MPAA ratings to help determine age and gender.

In addition, the system may be implemented as a whole or in parts. The neural network alone can be used to generate audience analytics at a household level rather than at the individual level of data generated by the system as a whole. Additionally, any and all of these combinations can be used to generate audience analytics.

What is claimed is:

1. A computer-implemented method of generating audience analytics comprising:

providing, by a computer, a database containing a plurality of user input pattern profiles representing a group of users of a terminal device, wherein the computer communicates with the terminal device over a network, the network comprising one or more of the Internet and a nodal television distribution network, wherein each user of the group is associated with one of the plurality of user input pattern profiles;

using, by the computer, an affinity-day part algorithm to generate the plurality of user input pattern profiles by detecting user affinity types and time of day input data, the user affinity types and time of day input data each being represented in an affinity sub-profile, the affinity types corresponding to at least one of a television station, a programming genre, a language, and a movie;

assigning, by the computer, a weight to the generated plurality of user input pattern profiles, the assigned weight being greater than a weight associated with a plurality of existing user input pattern profiles, by applying a decay factor to the plurality of existing user input pattern profiles;

detecting, by the computer, a user input pattern based upon use of the terminal device by a current user;

dynamically matching, by the computer, the user input pattern of the current user with one of the user input pattern profiles contained in the database identifying, by the computer, the current user based upon dynamic matching of the user input pattern generated by the current user with one of the user input pattern profiles;

processing, by the computer, each user input pattern profile to identify a demographic type;

providing, by the computer, a plurality of biometric behavior models wherein each biometric behavior model identifies a unique demographic type;

comparing, by the computer, each user input pattern profile against the plurality of biometric behavior models to match each user input pattern profile with one of the biometric behavior models such that each user input pattern profile is correlated with one demographic type; and generating, by the computer, an audience analytic based upon the identified demographic types.

2. The method of claim 1 wherein the user input pattern of the current user comprises clickstream data.

3. . The method of claim 1 wherein the clickstream data relates to particular Web sites visited by the user or the duration of visits to the Web sites.

4. The method of claim 1 wherein the database providing step comprises generating a user input pattern profile for each user based upon clickstream data generated by the user when using the terminal device.

5. The method of claim 1 wherein the user input pattern comprises one or more of user keystroke data, mouse usage data and remote control usage data.

6. The method of claim 1 wherein the terminal device comprises one of a computer and a set top box.

7. The method of claim 1 further comprising transmitting one or more of targeted content and targeted advertising to the user in accordance with the dynamically-matched user input pattern profile.

8. A computer-implemented method of generating audience analytics comprising:

providing, by a computer, a database containing a plurality of user input pattern profiles representing a group of users of a terminal device, wherein the computer communicates with the terminal device over a network, the network comprising one or more of the Internet and a nodal television distribution network, wherein each user of the group is associated with one of the plurality of user input pattern profiles;

using an affinity-day part algorithm to generate the plurality of user input pattern profiles by detecting user affinity types and time of day input data, the user affinity types and time of day input data each being represented in an affinity sub-profile, the affinity types corresponding to at least one of a television station, a programming genre, a language, and a movie;

assigning a weight to the generated plurality of user input pattern profiles, the assigned weight being greater than a weight associated with a plurality of existing user input pattern profiles, by applying a decay factor to the plurality of existing user input pattern profiles;

detecting a user input pattern based upon use of the terminal device by a current user;

dynamically matching the user input pattern of the current user with one of the user input pattern profiles contained in the database, wherein dynamically matching the user input pattern comprises comparing a partial user input, as a current user input comprising the partial user input is being generated by the current user, with one of the user input pattern profiles contained in the database;

identifying the current user based upon dynamic matching of the user input pattern generated by the current user with one of the user input pattern profiles;

processing each user input pattern profile to identify a demographic type;

providing a plurality of biometric behavior models wherein each biometric behavior model identifies a unique demographic type;

comparing each user input pattern profile against the plurality of biometric behavior models to match each user input pattern profile with one of the biometric behavior models such that each user input pattern profile is correlated with one demographic type; and generating an audience analytic based upon the identified demographic types.

9. A system for generating audience analytics, the system comprising:

means for providing a database containing a plurality of user input pattern profiles representing a group of users of a terminal device, wherein each user of the group is associated with one of the plurality of user input pattern profiles;

means for using an affinity-day part algorithm to generate the plurality of user input pattern profiles by detecting user affinity types and time of day input data, the user affinity types and time of day input data each being represented in an affinity sub-profile, the affinity types corresponding to at least one of a television station, a programming genre, a language, and a movie;

means for assigning a weight to the generated plurality of user input pattern profiles, the assigned weight being greater than a weight associated with a plurality of existing user input pattern profiles, by applying a decay factor to the plurality of existing user input pattern profiles;

means for detecting a user input pattern based upon use of the terminal device by a current user;

means, responsive to the means for detecting the user input pattern, for dynamically matching the user input pattern of the current user with one of the user input pattern profiles contained in the database, wherein dynamically matching the user input pattern comprises comparing a partial user input, as a current user input comprising the partial user input is being generated by the current user, with one of the user input pattern profiles contained in the database;

means for identifying the current user based upon dynamic matching of the user input pattern generated by the current user with one of the user input pattern profiles;

means for processing each user input pattern profile to identify a demographic type;

means for providing a plurality of biometric behavior models wherein each biometric behavior model identifies a unique demographic type;

means for comparing each user input pattern profile against the plurality of biometric behavior models to match each user input pattern profile with one of the biometric behavior models such that each user input pattern profile is correlated with one demographic type;

and means for generating an audience analytic based upon the identified demographic types.

10. A system for generating audience analytics, the system comprising:

means for providing a database containing a plurality of user input pattern profiles representing a group of users of a terminal device, wherein each user of the group is associated with one of the plurality of user input pattern profiles, wherein the plurality of user input pattern profiles are generated from an affinity-day part algorithm by detecting user affinity types and time of day input data, the user affinity types and time of day input data each being represented in an affinity sub-profile, the affinity types corresponding to at least one of a television station, a programming genre, a language, and a movie;

means for assigning a weight to the generated plurality of user input pattern profiles, the assigned weight being greater than a weight associated with a plurality of existing user input;

means for detecting a user input pattern based upon use of the terminal device by a current user;

means, responsive to the means for detecting the user input pattern, for dynamically matching the user input pattern of the current user with one of the user input pattern profiles contained in the database;

means for identifying the current user based upon dynamic matching of the user input pattern generated by the current user with one of the user input pattern profiles;

means for processing each user input pattern profile to identify a demographic type;

means for providing a plurality of biometric behavior models wherein each biometric behavior model identifies a unique demographic type;

means for comparing each user input pattern profile against the plurality of biometric behavior models to match each user input pattern profile with one of the biometric behavior models such that each user input pattern profile is correlated with one demographic type; and means for generating an audience analytic based upon the identified demographic types.

11. The system of claim 10 wherein the terminal device comprises a computer.

12. The system of claim 10 wherein the terminal device comprises a television set top box.

13. The system of claim 10 wherein the steps are implemented in a computer, and the computer communicates with the terminal device over a network.

14. The system of claim 13 wherein the network comprises the Internet.

15. The system of claim 13 wherein the network comprises a nodal television distribution network.

16. The system of claim 10 further comprising transmitting targeted content to the current user in accordance with the dynamically-matched user input pattern profile.

17. The system of claim 10 further comprising transmitting targeted advertising to the current user in accordance with the dynamically-matched user input pattern profile.

* * * * *